US011147072B2

(12) United States Patent
Liu et al.

(10) Patent No.: US 11,147,072 B2
(45) Date of Patent: Oct. 12, 2021

(54) RETUNING FOR FLEXIBLE RESOURCE ALLOCATION

(71) Applicant: QUALCOMM incorporated, San Diego, CA (US)

(72) Inventors: Le Liu, Fremont, CA (US); Alberto Rico Alvarino, San Diego, CA (US); Vijayvaradharaj Tirucherai Muralidharan, Santa Clara, CA (US); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/584,649

(22) Filed: Sep. 26, 2019

(65) Prior Publication Data

US 2020/0107326 A1    Apr. 2, 2020

(30) Foreign Application Priority Data

Sep. 28, 2018 (IN) .............................. 201841036816
Nov. 2, 2018 (IN) .............................. 201844041597

(51) Int. Cl.
*H04W 72/04* (2009.01)
*H04W 4/80* (2018.01)
(Continued)

(52) U.S. Cl.
CPC ....... *H04W 72/0493* (2013.01); *H04L 5/0051* (2013.01); *H04L 5/0082* (2013.01);
(Continued)

(58) Field of Classification Search
CPC ......... H04W 72/0493; H04W 72/0453; H04W 72/0446; H04W 4/80; H04L 5/0051; H04L 5/0082; H04L 25/0226
See application file for complete search history.

(56) References Cited

U.S. PATENT DOCUMENTS 10,708,923 B2 * 7/2020 Kumar .................. H04L 5/0053
2008/0212553 A1 * 9/2008 Shiu ...................... H03G 3/3036
370/343

(Continued)

FOREIGN PATENT DOCUMENTS

GB    2509913 A    7/2014

OTHER PUBLICATIONS

International Search Report and Written Opinion—PCT/US2019/053517—ISA/EPO—dated Dec. 17, 2019.

*Primary Examiner* — Rasheed Gidado
(74) *Attorney, Agent, or Firm* — Holland & Hart LLP; Nerrie M. Zohn

(57) ABSTRACT

Methods, systems, and devices for wireless communications are described. In some cases, devices such as band limited (BL) or coverage enhancement (CE) user equipment (UE) having limited transmitting and receiving capability may operate using a subset of a system bandwidth of a carrier (e.g., narrowbands). To support frequency hopping or frequency diversity in transmissions, for example, such devices may utilize retuning when a resource allocation moves from a first narrowband to a second narrowband. Retuning, however, may create challenges when transmitting and receiving capability is limited. Aspects of this disclosure may support a flexible starting physical resource block (PRB) for indicating new resource allocations for BL or CE UEs. In some aspects, a UE is disclosed which may retune between consecutive transmission time intervals (TTIs) or subframes, for example, from a first tuning band to a second tuning band (e.g., a newly defined retuning narrowband).

70 Claims, 15 Drawing Sheets

(51) Int. Cl.
*H04L 5/00* (2006.01)
*H04L 25/02* (2006.01)

(52) U.S. Cl.
CPC ........... *H04L 25/0226* (2013.01); *H04W 4/80* (2018.02); *H04W 72/0446* (2013.01); *H04W 72/0453* (2013.01)

(56) References Cited

U.S. PATENT DOCUMENTS

| | | | |
|---|---|---|---|
| 2013/0083753 A1 | 4/2013 | Lee et al. | |
| 2014/0187285 A1* | 7/2014 | Mallikarjunan | H04W 36/0022 455/552.1 |
| 2016/0249327 A1* | 8/2016 | Chen | H04L 5/0039 |
| 2016/0301503 A1* | 10/2016 | Alvarino | H04W 76/28 |
| 2016/0337157 A1* | 11/2016 | Papasakellariou | H04L 5/0016 |
| 2016/0381490 A1* | 12/2016 | Alvarino | H04L 5/0048 370/330 |
| 2017/0208590 A1* | 7/2017 | Kim | H04W 72/0446 |
| 2018/0070339 A1* | 3/2018 | Horiuchi | H04L 5/0053 |
| 2018/0219576 A1 | 8/2018 | Bhattad et al. | |
| 2018/0270838 A1* | 9/2018 | Maheshwari | H04W 52/346 |
| 2019/0320306 A1* | 10/2019 | Urabayashi | H04W 88/02 |
| 2019/0327715 A1* | 10/2019 | Wang | H04W 72/02 |

* cited by examiner

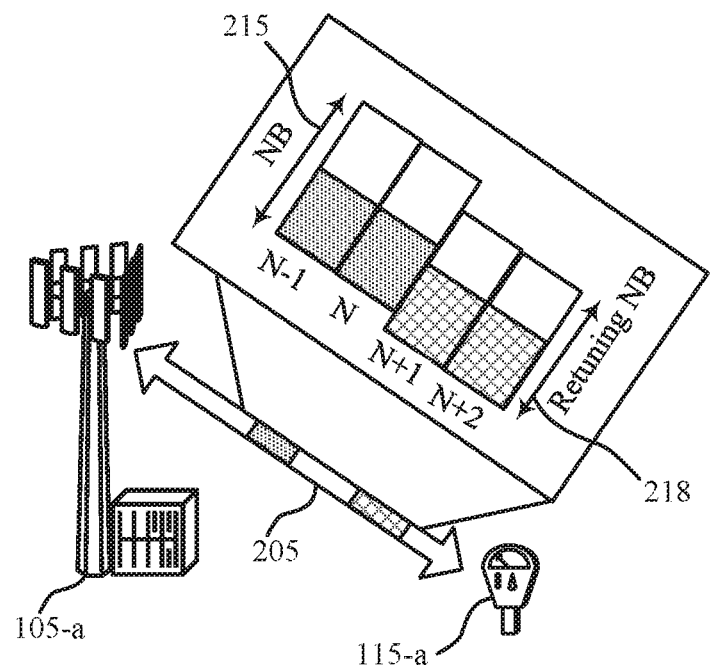
 First RA 210-a
 Second RA 210-b
FIG. 2

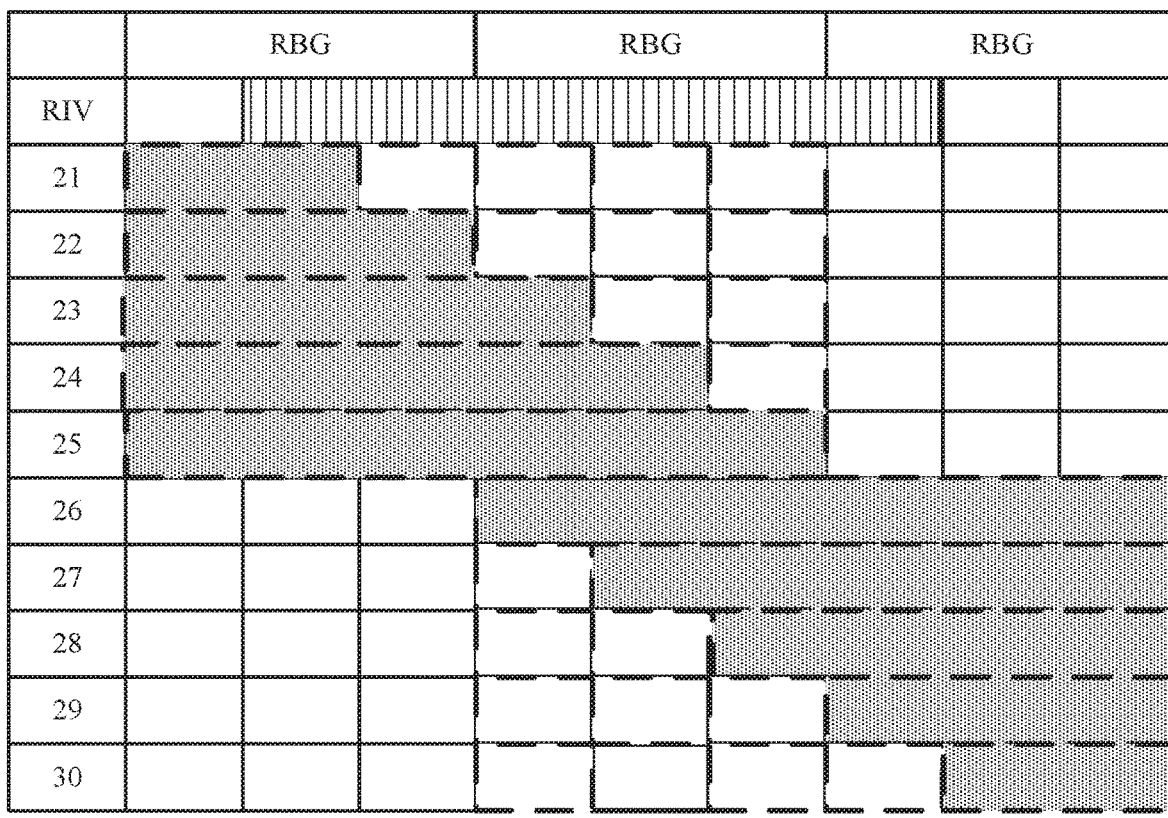
 Retuning NB 305
 Allocated RB(s) 310
 NB 315-a (index 'k')
FIG. 3A
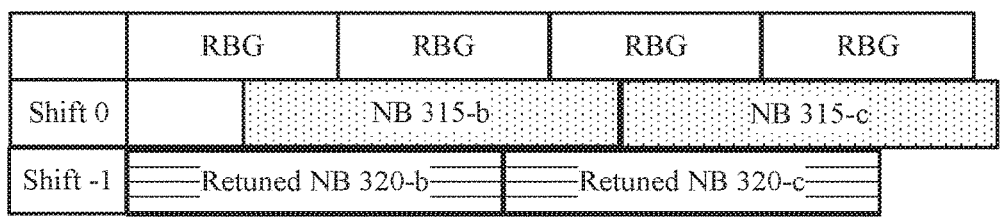
FIG. 3B

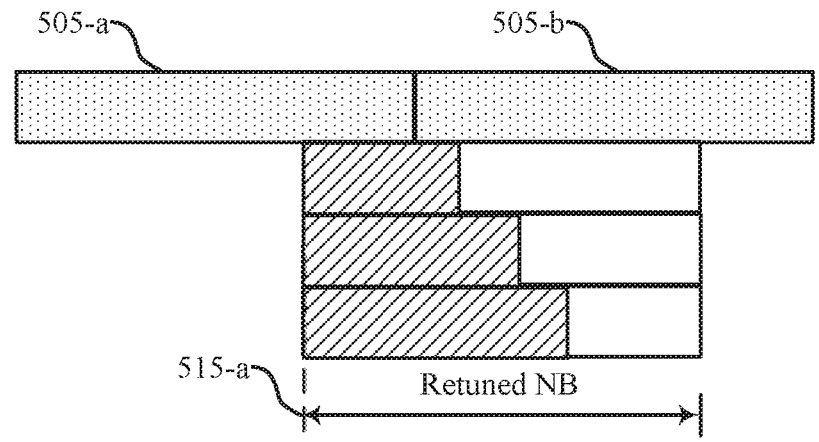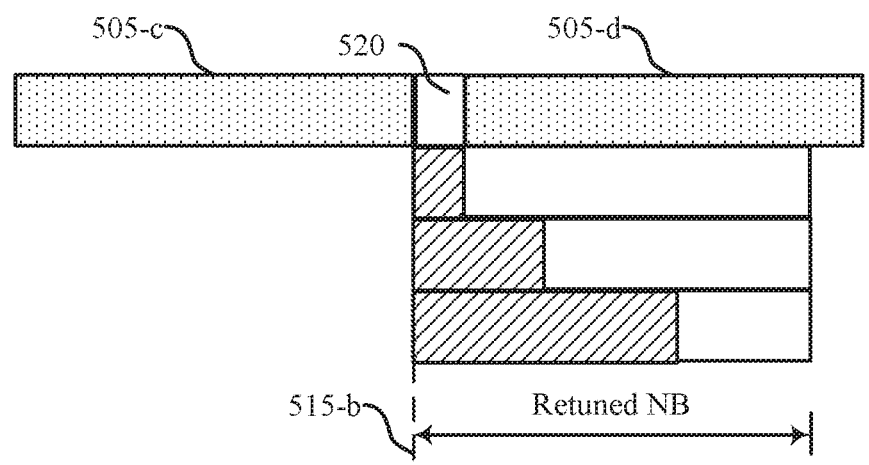
FIG. 5

615-a — Narrowband $n_{NB}$

| $n_{RB}$ | | RB#0 | RB#1 | RB#2 | RB#3 | RB#4 | RB#5 | |
|---|---|---|---|---|---|---|---|---|
| 0 | | 110 | 110 | | | | | |
| -1 | 110 | 110 | | | | | | |
| 1 | | | 110 | 110 | | | | |
| 2 | | | | 110 | 110 | | | |
| 3 | | | | | 110 | 110 | | |

Starting RB of retuned NB

615-b — Narrowband $n_{NB}$

| $n_{RB}$ | | RB#0 | RB#1 | RB#2 | RB#3 | RB#4 | RB#5 | |
|---|---|---|---|---|---|---|---|---|
| 0 | | | | 111 | 111 | | | |
| -1 | | | 111 | 111 | | | | |
| 1 | | | | | 111 | 111 | | |
| 2 | | | | | | 111 | 111 | |
| 3 | | | | | | | 111 | 111 |

▢ RA 605    ⌐⌐ Retuned NB 610    FIG. 6B    Ending RB of retuned NB

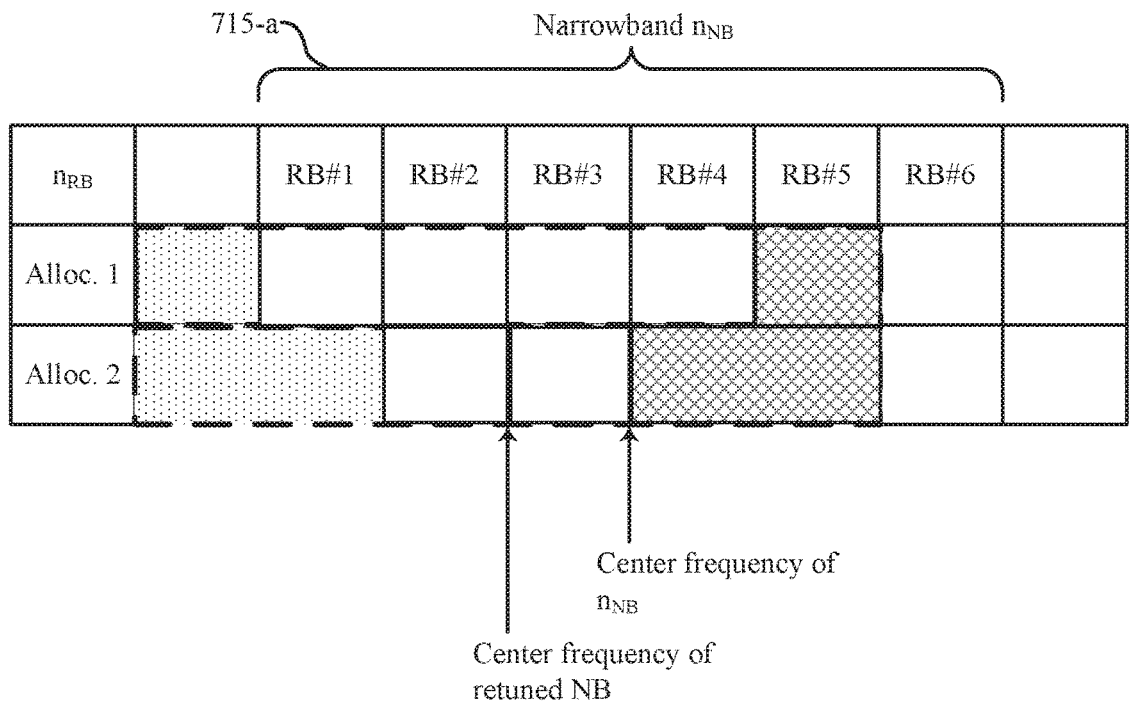
FIG. 7A
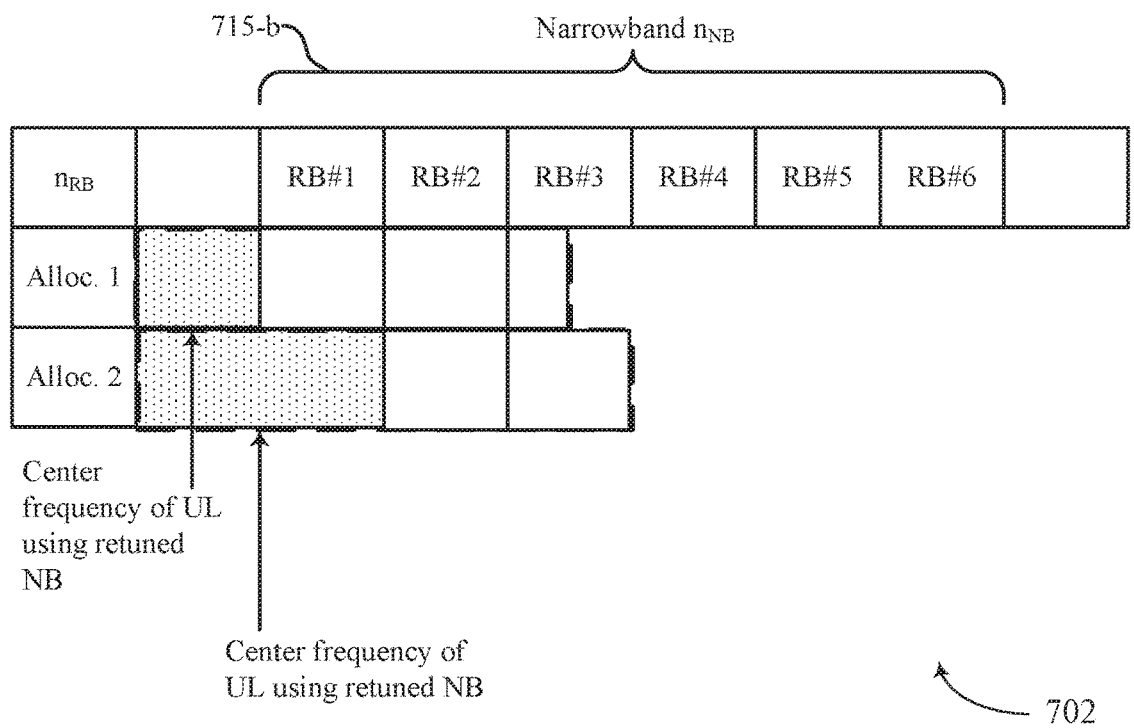
FIG. 7B

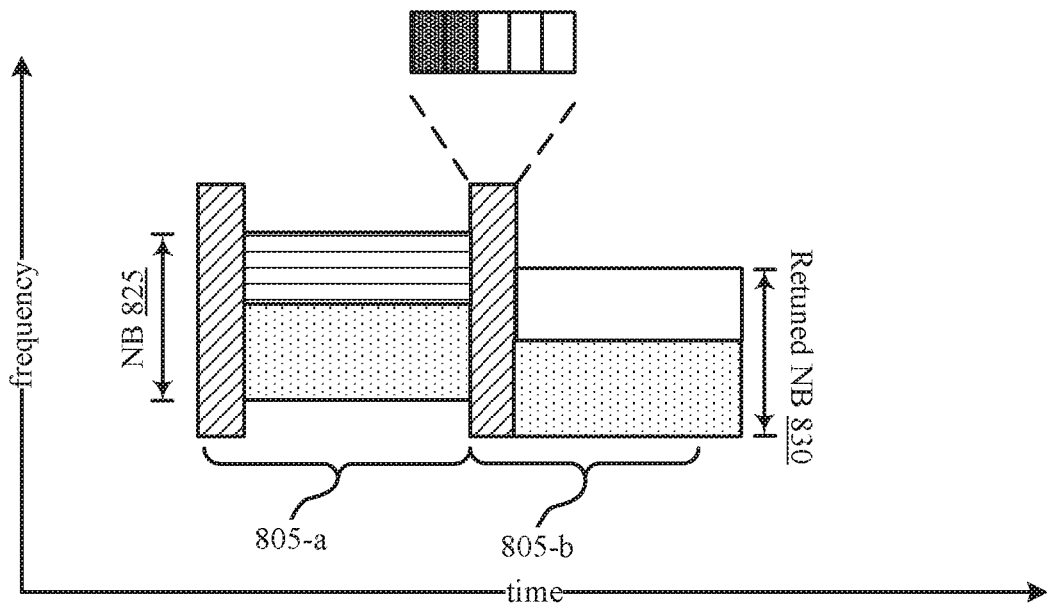
 Control channel 810
 MTC control channel 815
 Shared channel 820
 Punctured symbol 835
FIG. 8

RETUNING FOR FLEXIBLE RESOURCE ALLOCATION

CROSS REFERENCE

The present Application for Patent claims the benefit of India Provisional Patent Application No. 201841036816 by LIU et al., entitled "RETUNING FOR FLEXIBLE RESOURCE ALLOCATION," filed Sep. 28, 2018, and to India Provisional Patent Application No. 201844041597 by LIU et al., entitled "RETUNING FOR FLEXIBLE RESOURCE ALLOCATION" filed Nov. 2, 2018, each of which are assigned to the assignee hereof, and expressly incorporated by reference herein.

FIELD OF INVENTION

The following relates generally to wireless communications, and more specifically to retuning for flexible resource allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support retuning for flexible resource allocation. In some wireless communications systems, such as those supporting machine type communications (MTC), some devices (e.g., band limited (BL) or coverage enhancement (CE) UEs) may have limited transmitting and receiving capability, and may operate using a subset of a system bandwidth of a carrier (e.g., narrowbands). In some cases, such devices may retune portions of their receivers or transmitters to support frequency hopping or frequency diversity in transmissions. However, retuning may create challenges in efficient communication when transmitting and receiving capability is limited.

Generally, the described techniques provide for retuning a receiver in a wireless device, such as a BL or CE UE, supporting MTC. In some cases, an MTC UE may communicate over a narrowband (NB) of a wider system bandwidth. Further, the narrowbands within the system bandwidth may span a fixed number of physical resource blocks (PRBs) (e.g., 6 PRBs). In an example, the UE may be configured with a resource allocation with a flexible starting resource block (RB). In some cases, a flexible starting PRB may be used to indicate a new resource allocation, and may be supported for band limited or coverage enhancement UEs.

In some cases, a UE may retune between consecutive transmission time intervals (TTIs) or subframes. For instance, the UE may retune between a subframe 'N' and subframe 'N+1', when a narrowband (i.e., tuning band or allocation located NB) containing the resource allocation changes between the two subframes. In an example, a UE may perform retuning (e.g., in uplink (UL) or downlink (DL)) when the resource allocation moves from a first narrowband to a second narrowband. In some other cases, the UE may perform retuning if a portion of the resource allocation is not fully contained within a narrowband, and the allocation changes between the subframes. The retuning band, for example, may be determined based on alignment of a starting RB of the resource allocation with a resource block group (RBG) boundary, a narrowband shift or resource allocation shift indicated from the network or base station, or a starting RB of the resource allocation. In some aspects, the UE may drop a portion of the communication, or establish a guard period between subsequent communications due to the time associated with retuning. In some cases, the retuning time may be dependent on UE capability, and may be one or more symbols long.

A method of wireless communication is described. The method may include identifying, at a UE, a first resource allocation for a first communication in a first TTI and a second resource allocation for a second communication in a second, subsequent TTI, where the first resource allocation is associated with a first narrowband and the second resource allocation is associated with a second narrowband, and where a portion of the first resource allocation is located outside the first narrowband or a portion of the second resource allocation is located outside the second narrowband, determining that a first tuning band associated with the first resource allocation for the first TTI is different from a second tuning band associated with the second resource allocation for the second TTI, and retuning from the first tuning band to the second tuning band between the first communication and the second communication based on the determining.

An apparatus for wireless communication is described. The apparatus may include a processor, memory in electronic communication with the processor, and instructions stored in the memory. The instructions may be executable by the processor to cause the apparatus to identify, at a UE, a first resource allocation for a first communication in a first TTI and a second resource allocation for a second communication in a second, subsequent TTI, where the first resource allocation is associated with a first narrowband and the second resource allocation is associated with a second narrowband, and where a portion of the first resource allocation is located outside the first narrowband or a portion of the second resource allocation is located outside the second narrowband, determine that a first tuning band associated with the first resource allocation for the first TTI is different from a second tuning band associated with the second resource allocation for the second TTI, and retune from the first tuning band to the second tuning band between the first communication and the second communication based on the determining.

Another apparatus for wireless communication is described. The apparatus may include means for identifying, at a UE, a first resource allocation for a first communication in a first TTI and a second resource allocation for a second communication in a second, subsequent TTI, where the first resource allocation is associated with a first narrowband and the second resource allocation is associated with a second narrowband, and where a portion of the first resource allocation is located outside the first narrowband or a portion of the second resource allocation is located outside the second narrowband, determining that a first tuning band associated with the first resource allocation for the first TTI is different from a second tuning band associated with the second resource allocation for the second TTI, and retuning from the first tuning band to the second tuning band between the first communication and the second communication based on the determining.

A non-transitory computer-readable medium storing code for wireless communication is described. The code may include instructions executable by a processor to identify, at a UE, a first resource allocation for a first communication in a first TTI and a second resource allocation for a second communication in a second, subsequent TTI, where the first resource allocation is associated with a first narrowband and the second resource allocation is associated with a second narrowband, and where a portion of the first resource allocation is located outside the first narrowband or a portion of the second resource allocation is located outside the second narrowband, determine that a first tuning band associated with the first resource allocation for the first TTI is different from a second tuning band associated with the second resource allocation for the second TTI, and retune from the first tuning band to the second tuning band between the first communication and the second communication based on the determining.

Some examples of the method, apparatuses, and non-transitory computer-readable medium described herein may further include operations, features, means, or instructions for determining the second tuning band based on the second resource allocation and a set of RBGs for the system bandwidth.

In some examples of the method, apparatuses, and non-transitory computer-readable medium described herein, determining the second tuning band may include operations, features, means, or instructions for determining a starting RB of the second tuning band based on an alignment of a starting RB of the second resource allocation with a boundary of an RBG of the set of RBGs.

In some examples of the method, apparatuses, and non-transitory computer-readable medium described herein, determining the second tuning band may include operations, features, means, or instructions for determining an ending RB of the second tuning band based on an alignment of an ending RB of the second resource allocation with a boundary of an RBG of the set of RBGs.

In some examples of the method, apparatuses, and non-transitory computer-readable medium described herein, determining the second tuning band may include operations, features, means, or instructions for determining the second tuning band to start from a lowest RB of the system bandwidth when the portion of the second resource allocation located outside the second narrowband includes one or more edge RBs at a lower end of the system bandwidth that may be not included in a narrowband of the system bandwidth.

In some examples of the method, apparatuses, and non-transitory computer-readable medium described herein, determining the second tuning band may include operations, features, means, or instructions for determining the second tuning band to end at a highest RB of the system bandwidth when the portion of the second resource allocation outside the second narrowband includes one or more edge RBs at an upper end of the system bandwidth that may be not included in a narrowband of the system bandwidth.

In some examples of the method, apparatuses, and non-transitory computer-readable medium described herein, determining the second tuning band may include operations, features, means, or instructions for determining the second tuning band to start from a lowest RB of the second resource allocation when the portion of the second resource allocation outside the second narrowband may be exclusive of one or more edge RBs at a lower end or an upper end of the system bandwidth that may be not included in a narrowband of the system bandwidth.

In some examples of the method, apparatuses, and non-transitory computer-readable medium described herein, determining the second tuning band may include operations, features, means, or instructions for determining the second tuning band to start at a starting RB of the second resource allocation, or end at an ending RB of the second resource allocation.

Some examples of the method, apparatuses, and non-transitory computer-readable medium described herein may further include operations, features, means, or instructions for receiving, from a base station, control information indicating the first resource allocation, the second resource allocation, or both.

In some examples of the method, apparatuses, and non-transitory computer-readable medium described herein, the first tuning band corresponds to the first narrowband.

In some examples of the method, apparatuses, and non-transitory computer-readable medium described herein, the second tuning band corresponds to the second narrowband.

Some examples of the method, apparatuses, and non-transitory computer-readable medium described herein may further include operations, features, means, or instructions for receiving one or more bits indicating a shift of the second narrowband and determining the second tuning band based on the shift.

Some examples of the method, apparatuses, and non-transitory computer-readable medium described herein may further include operations, features, means, or instructions for receiving one or more bits indicating a shift of the second resource allocation relative to the second narrowband and determining the second tuning band based on the shift.

In some examples of the method, apparatuses, and non-transitory computer-readable medium described herein, the second tuning band starts at a starting RB of the second resource allocation.

In some examples of the method, apparatuses, and non-transitory computer-readable medium described herein, the second tuning band ends at an ending RB of the second resource allocation.

In some examples of the method, apparatuses, and non-transitory computer-readable medium described herein, identifying the second resource allocation may include operations, features, means, or instructions for receiving control information in a TTI prior to the second TTI, the control information including a grant for the second resource allocation.

In some examples of the method, apparatuses, and non-transitory computer-readable medium described herein, each of the first and second tuning bands may be composed of continuous frequency resources having a same size as the first or the second narrowband.

In some examples of the method, apparatuses, and non-transitory computer-readable medium described herein, the first narrowband and the second narrowband correspond to a common narrowband.

In some examples of the method, apparatuses, and non-transitory computer-readable medium described herein, the first tuning band corresponds to the common narrowband.

In some examples of the method, apparatuses, and non-transitory computer-readable medium described herein, the first narrowband may be different from the second narrowband.

Some examples of the method, apparatuses, and non-transitory computer-readable medium described herein may further include operations, features, means, or instructions for identifying a configuration for transmitting a sounding reference signal (SRS) in the first TTI and refraining from transmitting the SRS based on determining the first tuning band may be different from the second tuning band.

Some examples of the method, apparatuses, and non-transitory computer-readable medium described herein may further include operations, features, means, or instructions for identifying a configuration for transmitting a SRS in the first TTI, where a portion of the SRS may be outside the second tuning band and refraining from transmitting the SRS based on identifying that the portion of the SRS may be outside the second tuning band.

Some examples of the method, apparatuses, and non-transitory computer-readable medium described herein may further include operations, features, means, or instructions for identifying a configuration for a SRS in the first TTI, where a portion of the SRS may be outside the second tuning band, establishing a guard period between the first communication in the first TTI and the second communication in the second TTI and transmitting the SRS based on the establishing.

Some examples of the method, apparatuses, and non-transitory computer-readable medium described herein may further include operations, features, means, or instructions for establishing a guard period between the first communication in the first TTI and the second communication in the second TTI.

In some examples of the method, apparatuses, and non-transitory computer-readable medium described herein, establishing the guard period may include operations, features, means, or instructions for puncturing one or more symbols of the second communication based on the retuning.

In some examples of the method, apparatuses, and non-transitory computer-readable medium described herein, the puncturing may be based on determining that the first and second communications may be downlink communications.

In some examples of the method, apparatuses, and non-transitory computer-readable medium described herein, the puncturing may be based on determining that the first communication may be an uplink communication and the second communication may be a downlink communication.

In some examples of the method, apparatuses, and non-transitory computer-readable medium described herein, the UE may be configured for monitoring a control channel within the first narrowband.

Some examples of the method, apparatuses, and non-transitory computer-readable medium described herein may further include operations, features, means, or instructions for refraining from monitoring the control channel in the second TTI based on determining that at least a portion of the control channel does not overlap with the second tuning band.

Some examples of the method, apparatuses, and non-transitory computer-readable medium described herein may further include operations, features, means, or instructions for identifying a portion of the control channel within the first narrowband that overlaps in frequency with the second tuning band and monitoring, in the second TTI, the portion of the control channel for control information.

Some examples of the method, apparatuses, and non-transitory computer-readable medium described herein may further include operations, features, means, or instructions for monitoring an adjusted control channel in the second TTI for control information, the adjusted control channel being adjusted based on a relative offset of the second tuning band to the first narrowband.

In some examples of the method, apparatuses, and non-transitory computer-readable medium described herein, the second communication may be an uplink communication. Further, some examples of the method, apparatuses, and non-transitory computer-readable medium described herein may include operations, features, means, or instructions for determining a center frequency of the second communication based on a coverage enhancement mode for the UE, a tuning time capability of the UE, a tuning configuration received from a base station, a reference signal configuration for the second communication, or a combination thereof.

In some examples of the method, apparatuses, and non-transitory computer-readable medium described herein, the determining the center frequency of the second communication may include operations, features, means, or instructions for setting the center frequency associated with the second communication to coincide with a center of the second tuning band.

In some examples of the method, apparatuses, and non-transitory computer-readable medium described herein, the determining the center frequency of the second communication may include operations, features, means, or instructions for setting the center frequency associated with the second communication to coincide with a center of the second resource allocation.

In some examples of the method, apparatuses, and non-transitory computer-readable medium described herein, the tuning configuration may be received from the base station in a unicast transmission or a broadcast transmission.

In some examples of the method, apparatuses, and non-transitory computer-readable medium described herein, the coverage enhancement mode for the UE may be one of a first coverage enhancement mode associated with a first amount of repetition or a second coverage enhancement mode associated with a second, larger amount of repetition.

BRIEF DESCRIPTION OF THE DRAWINGS

FIGS. 1 and 2 illustrate examples of systems for wireless communications that support retuning for flexible resource allocation in accordance with aspects of the present disclosure.

FIGS. 3A and 3B illustrate examples of resource grids that support retuning for flexible resource allocation in accordance with aspects of the present disclosure.

FIG. 5 illustrates examples of a resource grid that supports retuning for flexible resource allocation in accordance with aspects of the present disclosure.

FIGS. 6A and 6B illustrate examples of resource grids that support retuning for flexible resource allocation in accordance with aspects of the present disclosure.

FIGS. 7A and 7B illustrate examples of resource grids that support retuning for flexible resource allocation in accordance with aspects of the present disclosure.

FIG. 8 illustrates an example of a resource grid that supports retuning for flexible resource allocation in accordance with aspects of the present disclosure.

DETAILED DESCRIPTION

Figure 1:
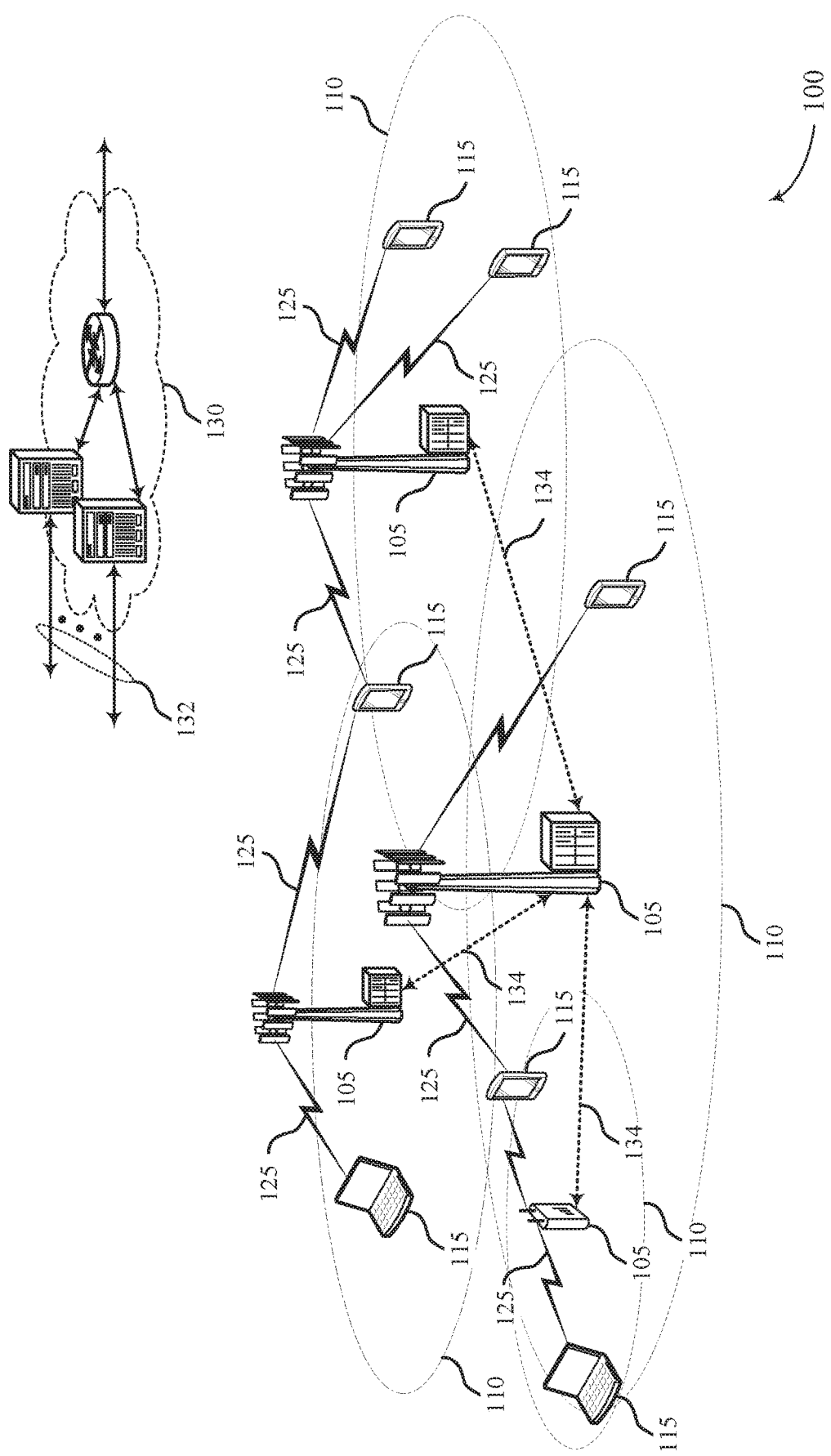

Some wireless systems support data communication technologies that allow devices to communicate with one another or a base station without human intervention. Such communication may be referred to as machine type communication (MTC). In some cases, systems may use techniques or features tailored for MTC devices, which may be referred to as enhanced MTC (eMTC). A MTC device or MTC UE may be a low complexity, low cost device—relative to other user equipment (UEs)—and may be characterized by features such as low power operation, limited duplexing capability, and operation in environments with poor radio link conditions. To support eMTC, systems may be configured to account for operating characteristics of MTC devices. In some cases, MTC UEs may use narrowband operation within a wider system bandwidth. For example, a carrier may have a system bandwidth of 1.4, 3, 5, 10, 15, or 20 MHz, which may be composed of a plurality of narrowbands, and MTC UEs may be configured for operation over a single narrowband of the carrier at a time. In some examples, a narrowband may include a set of contiguous frequency resources (e.g., 6 physical resource blocks (PRBs)), and a plurality of narrowbands (NBs) may be predefined or preconfigured in the network for the different bandwidths (e.g., 3 MHz, 5 MHz, etc.).

In some wireless systems, the frequency of transmitted signals may be changed periodically. This frequency hopping or shifting may help achieve frequency diversity and may help avoid narrowband interference. In some cases, UEs may have a wideband operation capability and may receive the signal as the frequency is changed. Other devices, such as some MTC UEs, may not be configured for wideband operation (e.g., operation over a full carrier bandwidth). In such cases, the device may retune each time the frequency changes. This retuning may take a finite period of time and may result in increased network overhead. In some cases, frequency retuning may occur in a period of less than a subframe, for example, on the order of a few symbol periods.

In some cases, UEs and network equipment, such as base stations, may adjust their operation to support frequency hopping within a system. For example, a machine type communication (MTC) UE may retune portions of its receive or transmit chain to support operation on various frequency bands. This retuning may introduce a delay, which the MTC UE and a base station may account for, and the duration of the retuning can be significantly reduced (e.g., on the order of symbol periods) if both the base station and UE anticipate or account for delays. For example, a base station may refrain from transmitting to the MTC UE for a period of time (e.g., one, two, or three symbol periods) to account for a MTC UE's retuning. In some cases, a base station may also account for frequency hopping delays for uplink communications. For instance, a base station may determine a retuning delay to decode uplink transmissions accordingly.

According to aspects of this disclosure, a flexible starting physical resource block for indicating a new resource allocation may be supported for band limited (BL) or coverage enhancement (CE) UEs. In some cases, the UE may retune between consecutive transmission time intervals (TTIs) or subframes. For instance, the UE may retune between a subframe 'N' and subframe 'N+1', when the narrowband containing the resource allocation changes between the two subframes. In some other cases, the UE may perform retuning from a first tuning band to a second tuning band (e.g., a newly defined retuning narrowband) if a portion of the resource allocation is not fully contained within a narrowband, and the allocation changes between the subframes. In some cases, the newly defined retuning narrowband may be referred to as an allocation located retuning narrowband, and may be based in part on the new resource allocation, a set of resource block groups (RBGs) for the system bandwidth, an alignment of a starting or ending resource block (RB) of the new resource allocation with a RBG boundary, edge resource blocks at a lower or upper end of the system bandwidth not included in a narrowband of the system bandwidth, etc. In some other cases, the new retuning narrowband may be based in part on a shift for a narrowband associated with the new resource allocation for the subsequent communication in subframe 'N+1'. In some aspects, the retuning time may be dependent on UE capability, and may be one or more symbols long.

In some cases, if the center frequency for the subsequent communication during subframe 'N+1' coincides with the center of a newly defined retuning narrowband, the communication may introduce additional interference at the receiver end. For instance, a UE utilizing the newly defined retuning narrowband for uplink communications may cause additional interference at the base station (e.g., in the form of mirror image interference) in regards to transmissions from one or more other UEs utilizing a different narrowband (e.g., a predefined narrowband) or different parts of the narrowband. In such cases, the additional interference may be mitigated through appropriate selection of a center frequency for the subsequent communication, based on a coverage enhancement mode for the UE, a tuning time capability of the UE, a tuning configuration received from a base station, or a reference signal configuration for the subsequent communication.

In some cases, during retuning, the UE may refrain from communicating with the base station, or other UEs. In some cases, if the UE is configured to support resource allocation with a flexible starting physical resource block, the resource allocation for shared channel transmissions (e.g., PDSCH or PUSCH) may lie outside a preconfigured narrowband of the system bandwidth. Thus, efficient techniques for supporting tuning bands that may be different than configured narrowbands, and retuning between tuning bands are desired to optimize communications in the network.

Aspects of the disclosure are initially described in the context of a wireless communications system. Aspects of the disclosure are further illustrated by and described with reference to resource grids, apparatus diagrams, system diagrams, and flowcharts that relate to retuning for flexible resource allocation.

FIG. 1 illustrates an example of a wireless communications system 100 that supports retuning for flexible resource allocation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

FIG. 2 illustrates an example of a wireless communications system 200 that supports retuning for flexible resource allocation in accordance with aspects of the present disclosure. In some examples, wireless communications system 200 may implement aspects of wireless communication system 100. As shown, wireless communications system 200 may include a base station 105-a and a UE 115-a, which may be examples of the devices described with reference to FIG. 1. In some cases, UE 115-a and base station 105-a may communicate using communication link 205. In some examples, UE 115-a may be a BL or CE UE, a wireless sensor, wireless meter, or another MTC device.

In some cases, in wireless communication system 200, UE 115-a and base station 105-a may communicate over narrowbands of a wider system bandwidth, and may support the use of a flexible starting PRB for indicating a new resource allocation. In some cases, a BL or CE UE, such as UE 115-a, may support a bandwidth of up to 1.4 MHz, divided into a plurality of narrowbands. In some cases, the narrowbands may include six (6) consecutive PRBs at predefined locations within the system bandwidth. In some cases, the narrowbands of the system bandwidth may span portions of one or more RBGs, where each RBG may include one or more RBs. In some cases, the number of RBs within a RBG may vary with the operating bandwidth. In some cases, resource allocation may be indicated differently for downlink and uplink communications. Further, indication of resource allocation may also differ based on the coverage enhancement mode or mode of operation (e.g., CEModeA, or CEModeB) for the UE. In some cases, CEModeA may refer to a mode of operation with a limited number (or no) of repetitions, whereas CEModeB may refer to a coverage enhancement mode associated with a large number of repetitions. In some cases, CEModeB may provide a greater level of coverage enhancement than CEModeA, and may be deployed when propagation conditions are below a threshold (or quality).

In some cases, for example, for Physical Downlink Shared Channel (PDSCH) CEModeA, resource allocation may be defined relative to a narrowband by a plurality of states of a resource indication value (RIV). In some cases, the RIV and a narrowband index may be indicated from the base station or network via downlink control information (DCI). The RIV values may be indexed (e.g., according to a table) to indicate a starting RB (e.g., relative to a starting RB of a narrowband) and a number of RBs in the allocation. In some cases, states of the RIV may indicate resource allocations based on an alignment of the starting or ending PRBs with a RBG boundary below or above a predefined NB in the system bandwidth. Thus, in some aspects, resource allocation outside the predefined NBs may be supported for UEs with a flexible starting PRB.

In some other cases, for example, for PDSCH CEModeB, one or more bits indicating a NB shift may be transmitted from the base station to the UE. In some cases, the NB shift may be a value predefined for each NB index of different system bandwidths (e.g., 1.4 MHz, 3 MHz, etc.) In some cases, when the flexible starting PRB is enabled for a UE (e.g., using 1-bit UE specific RRC signaling), the NB may be shifted using the predefined value. In such cases, the resource allocation may be within the shifted NB, while at least a portion may be outside the predefined narrowbands of the system bandwidth. In some cases, a wideband RIV of a UL resource allocation (RA) type (e.g., UL RA type 0) may be used to indicate a flexible starting PRB within the system bandwidth, for instance, for PUSCH CEModeA. In some cases, if a wideband RIV for PUSCH is used for the UL grant transmitted from the base station to the UE, there may be no indication of a narrowband index. For instance, the resource allocation may be indicated via the RIV as a function of the starting PRB index, and a number of consecutively allocated PRBs. It should be noted that the number of allocated RBs may be limited to the maximum bandwidth supported by the UE (e.g., up to 6 PRBs for BL/CE UEs with a maximum of 1.4 MHz bandwidth). In some cases, in PUSCH CEModeB, an RB shift of $n_{RB}=\{-1,1,2,3\}$ PRBs may be configured to adjust the starting PRB of a 2-PRB RA, where a positive number shifts the starting PRB towards a higher PRB index. In some cases, the NB or RB shift may be configured semi-statically (e.g., in RRC signaling).

In some cases, the UE 115-a may retune between consecutive transmission time intervals (TTIs) or subframes, when the narrowband containing the resource allocation changes between the two subframes (i.e., RA moves from a first narrowband to a second narrowband). In some cases, during retuning, the UE 115-a may refrain from communicating with the base station 105-a, or other UEs. The allowed time period to retune may be based on the assumption that the UE radio frequency (RF) front end is the same width as a NB. In some cases, if the UE is configured to support RA with a flexible starting PRB, the RA for shared channel transmissions (e.g., PDSCH or PUSCH) may lie outside a preconfigured narrowband of the system bandwidth. For instance, as shown in FIG. 2, the UE 115-a may identify a first RA 210-a for a first communication over communication link 205 in a first subframe (e.g., subframe N), and a second RA 210-b for a second communication in a second, subsequent subframe (e.g., subframe N+1), where the first communication may be associated with a first narrowband and the second communication may be associated with a second narrowband. In some cases, the narrowbands of the system bandwidth may each be associated with a narrowband index, and the resource allocation received by the UE 115-a may indicate the associated NB index. For instance, the DCI transmitted from the base station 105-a may be used to indicate the NB index, in addition to the RIV for a RA. In some examples, the DCI may carry a NB index for downlink resource allocations, without a NB index for uplink resource allocations, such as for a UE with PUSCH in CEModeA using a flexible starting PRB.

In some cases, the first and second RAs (e.g., RA 210-a and RA 210-b) may be associated with separate tuning bands, which may occupy the same number of frequency resources as a narrowband. In some cases, the UE 115-a may determine that the first tuning band is different from the second tuning band. In some cases, the tuning bands may be defined based on the location of the allocated resources, and thus, may also be referred to as allocation referenced narrowbands. In the example of FIG. 2, NB 215 may represent the first tuning band for the first resource allocation, and tuning NB 218 may represent the second tuning band for the second resource allocation. Further, the UE 115-a may retune from the first tuning band to the second tuning band between the first communication using the first RA 210-a, and the second communication using the second RA 210-b. It should be noted that the retuning allocation referenced narrowband (i.e., second tuning band) may also be associated with a NB index, which may be the same or different than the NB index for subframe N. In some aspects, the retuning time may be dependent on UE capability, and may be negligible, or one or more symbols long. In some cases, a tuning narrowband may also be referred to as a tuning band, a tuning or retuning band, a retuning NB, a retuned NB, a band for RF retuning, or, a tuned or retuned band.

In some cases, the UE 115-a may tune its transmitter chain components to utilize the second tuning band, as is, for the second communication using the second RA 210-b. In such cases, a center frequency for the second communication may coincide with the center of the newly defined retuning narrowband (i.e., second tuning band), which may introduce additional interference at the receiver end. For instance, the UE 115-a utilizing the newly defined retuning narrowband for uplink communications may cause additional interference at the base station (e.g., in the form of mirror image interference) to transmissions from one or more other UEs 115 utilizing a different narrowband (e.g., a predefined narrowband of the system bandwidth) or different parts of the same narrowband. In such cases, the additional interference may be mitigated through appropriate selection of a center frequency for the second, subsequent communication, based on a coverage enhancement mode for the UE 115-a, a tuning time capability of the UE 115-a, a tuning configuration received from a base station, and/or a reference signal configuration for the subsequent communication. In some aspects, the frequency span tuned by the transmitter chain components for the second communication may be the same as, or different from the second tuning band (i.e., allocation located narrowband).

FIGS. 3A and 3B illustrate examples of resource grids 301 and 302 that support retuning for flexible resource allocation in accordance with aspects of the present disclosure. In some examples, resource grids 301 and 302 may be implemented by aspects of wireless communication systems 100 and/or 200.

As shown, resource grid 301 illustrates various downlink resource allocations defined using RIV values 21 through 30 (e.g., with RIV values 0 to 20 not shown). Further, in the example shown, the operating bandwidth is 10 MHz with 50 RBs, and an RBG size of 3 PRBs is defined. In some cases, NB 315-a may be a NB of a wider system bandwidth, and may not be aligned with an RBG boundary.

In the example of FIG. 3A, in some cases, such as for PDSCH with CEModeA, the UE may identify allocated RBs 310 based on an indication from the base station. In some cases, the indication may include a grant, and may be received via DCI. In some aspects, the indication may include a RIV value, which may be used by the UE to determine a starting RB of the allocated RBs 310, as well as the number of RBs. In some cases, the starting RB of allocated RBs 310 may be aligned with a RBG boundary. It should be noted that the resource allocation for the communication may be associated with NB 315-a with index 'k'. In some cases, the resource allocation may be within a single narrowband, and the tuning band may be the same as the narrowband. In some other cases, the tuning band may be different from the narrowband.

In some cases, if the starting RB of the resource allocation aligns with a RBG boundary, tuning NB 305 (e.g., which may also be referred to as retuning NB 305) may start from the starting RB (i.e., as seen for RIV 21 to 25). In some aspects, the location of the tuning band for the resource allocation (i.e., location within system bandwidth) may be different from the narrowband of the resource allocation, and the UE may retune to the tuning band if at least a portion of the resource allocation is outside the predefined narrowband. In some cases, the tuning band and the narrowband may be the same size (e.g., 6 consecutive PRBs). In some other cases, the tuning band may be the same as the narrowband (e.g., if the starting RB is not aligned with a RBG boundary). In some other cases, if an ending RB of the resource allocation is aligned with an RBG boundary above a predefined narrowband in the system bandwidth (i.e., if $RB_{start}+L_{CRBs}-1$ is aligned with an RBG boundary, where $L_{CRBs}$ is associated with number of RBs for the resource allocation), the tuning NB 305 may end at the ending RB of the resource allocation (i.e., last RB of allocated RBs 310). Thus, as shown for RIV values 26 to 30, the tuning NB 305 may end at the RBG boundary, which may be outside the predefined narrowband. In some other cases, the tuning band may be the same as the narrowband (i.e., if the resource allocation is entirely within the narrowband), and the UE may determine not to retune.

In some other cases, and as shown in FIG. 3B, the UE may receive an indication of a narrowband shift from the network or base station (e.g., for PDSCH with CEModeB). In some cases, the narrowband shift may be used to indicate a shift (e.g., in RBs) with respect to the narrowband (e.g., NB 315-b, and NB 315-c). In such cases, the tuning narrowband may adjusted according to the shifted NB (i.e., NB 315-b and NB 315-c after applying the shift). Further, in some examples, the indicated shift may be used to align the starting RB of the resource allocation with a RBG boundary. In the example shown, the UE using a flexible starting PRB may retune NB 315-b and NB 315-c as the tuning NBs 320-b and 320-c (e.g., which may also be referred to as retuned NBs 320-b and 320-c) based on a '−1' RB shift.

Figure 4A:
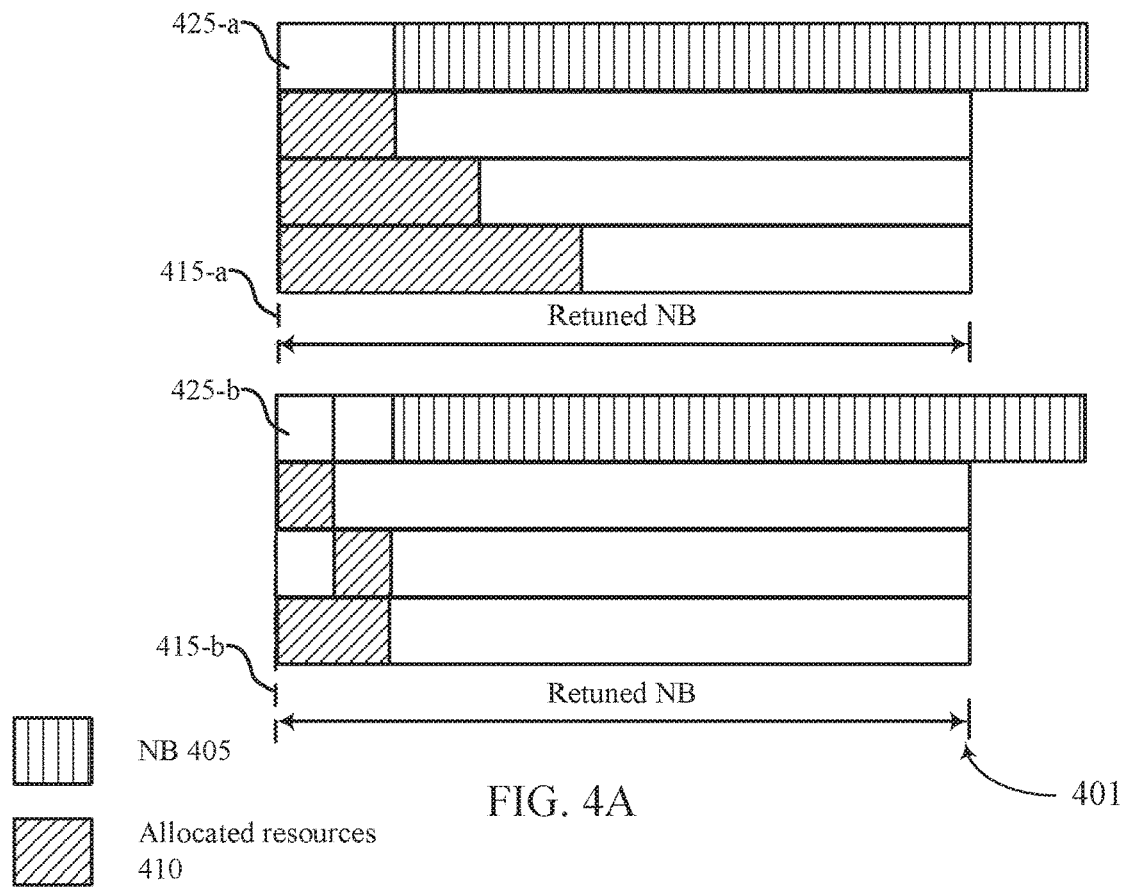
FIGS. 4A and 4B illustrate examples of resource grids that support retuning for flexible resource allocation in accordance with aspects of the present disclosure.
Figure 4B:
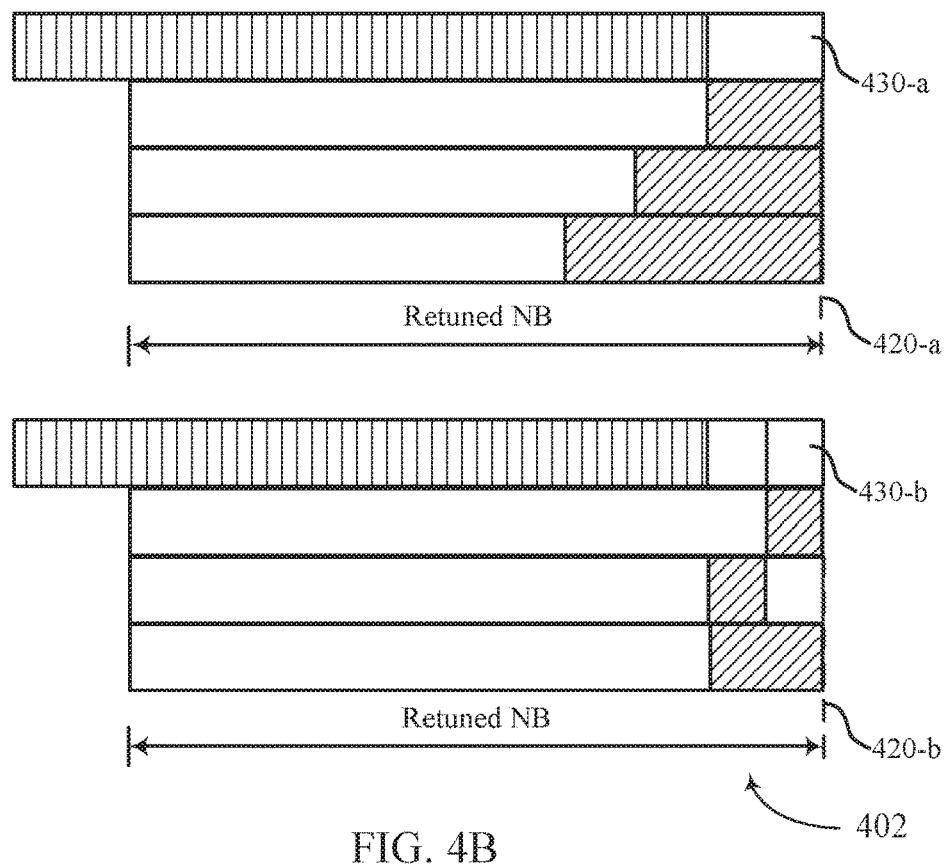

FIGS. 4A and 4B illustrate examples of resource grids 401 and 402 that support retuning for flexible resource allocation in accordance with aspects of the present disclosure. In some examples, resource grids 401 and 402 may be implemented by aspects of wireless communication system 100 and/or 200.

As shown, resource grids 401 and 402 illustrate various uplink resource allocations for portions of 3/10/15 MHz, and 20 MHz bandwidth. The uplink allocations may be indicated by a wideband RIV of a UL RA type (e.g., UL RA type 0), and may be used to indicate a flexible starting PRB within the system bandwidth.

In some examples, a portion of allocated resources 410 may be located outside a narrowband, such as NB 405. In some cases, NB 405 may be an example of a narrowband of the system bandwidth, and may be predefined. In some examples, a tuning NB may be determined based on a portion of the resource allocation being located outside a narrowband. As shown, the portion of the allocated resources outside a narrowband may include one or more left edge RBs 425 (e.g., left edge RBs 425-a or 425-b) that are not included in NB 405 of the system bandwidth. In FIGS. 4A and 4B, left edge RBs may be used to refer to edge RBs at the lower end of the system bandwidth, while right edge RBs may be used to refer to edge RBs at the upper end of the system bandwidth. In such cases, the tuning NB (e.g., retuned NB) may be determined to start from a lowest RB (e.g., RB start 415-*a*, or RB start 415-*b*) of the system bandwidth.

In some other cases, and as shown in FIG. 4B, the portion of the resource allocation (e.g., allocated resources 410) outside NB 405 may include one or more right edge RBs 430 (e.g., right edge RBs 430-*a* or 430-*b*) that are not included in NB 405 of the system bandwidth. In such cases, the tuning NB (e.g., retuned NB) may end at a last RB (e.g., RB end 420-*a*, or RB end 420-*b*) of the system bandwidth.

In some examples, the tuning NB may start from the starting RB of the resource allocation, as further described with reference to FIG. 5. In some other cases, the tuning NB may end at an ending RB of the resource allocation.

FIG. 5 illustrates an example of a resource grid 500 that supports retuning for flexible resource allocation in accordance with aspects of the present disclosure. In some examples, resource grid 500 may be implemented by aspects of wireless communication system 100 or 200. As shown, resource grid 500 illustrates various uplink resource allocations for portions of 3/10/15 MHz, and 20 MHz bandwidth.

As shown in FIG. 5, in some cases, the UE may identify an uplink resource allocation (e.g., for PUSCH CEModeA), and determine that a portion of allocated resources 510 are not fully contained within a single NB 505 (e.g., NB 505-*a* or NB 505-*b*). In such cases, the UE may determine a starting RB (e.g., RB start 515-*a*) for the allocated resources 510, and the tuning NB (e.g., retuned NB) may include six (6) consecutive PRBs starting from the starting RB (e.g., RB start 515-*a*).

In another example, NB 505-*c* and NB 505-*d* may be separated by one or more RBs 520, and allocated resources 510 may include a starting RB (e.g., RB start 515-*b*). In such cases, the UE may perform retuning, where the tuning NB (e.g., retuned NB) starts from the starting RB (e.g., RB start 515-*b*).

FIGS. 6A and 6B illustrate examples of resource grids 601 and 602 that support retuning for flexible resource allocation in accordance with aspects of the present disclosure. In some examples, resource grids 601 and 602 may be implemented by aspects of wireless communication system 100 and/or 200. As shown, resource grids 601 and 602 illustrate examples of uplink resource allocations for a wireless system supporting the use of a flexible starting PRB for a 2-PRB allocation (e.g., for PUSCH with CEModeB).

In some cases, for PUSCH with CEModeB, the UE may receive one or more bits in higher layer signaling (e.g., RRC signaling) from the base station, the bits indicating a shift for the 2-PRB allocation. In FIGS. 6A and 6B, 2-PRB allocations of RIV '110' and '111' may be shifted by a higher layer configured $n_{RB}$. In some cases, a decreased number of bits (e.g., 3 or less) may be used for RIV, in addition to a NB index indicated in a UL grant (e.g., via DCI) for PUSCH with CEModeB. In some cases, $n_{RB}$ may be used to indicate a shift (in number of RBs) for the resource allocation. As illustrated, in some cases, the 2-PRB RA may lie within a NB 615 (e.g., NB 615-*a*, NB 615-*b*), which may be a narrowband of the system bandwidth. Further, a tuning narrowband (e.g., retuned NB 610) may be determined based on the indicated shift. In some cases, the tuning narrowband (e.g., retuned NB 610) may be the same as NB 615-*a*, based in part on a starting RB or ending RB for the 2-PRB RA.

In the example of FIG. 6A, with a shift of '−1', the 2-PRB allocation of '110' may be shifted outside NB 615-*a*. In such cases, the tuning narrowband (e.g., retuned NB 610) may start from $n_{RB}$ relative to the starting RB of NB 615-*a*. In other cases, such as with a shift of '1', '2', or '3', the tuning NB may be the same as the narrowband (not shown).

In the example of FIG. 6B, with a shift of '3', the resource allocation of '111' lies outside the NB 615-*b*. Thus, tuning narrowband (e.g., retuned NB 610) may end at '$n_{RB}$+3', since the resource allocation of '111' lies outside the NB 615-*b*. Similar to FIG. 6A, if RA 605, or a portion of RA 605, does not lie outside the NB 615-*b*, the tuning narrowband (e.g., retuned NB 610) may be the same as the narrowband (i.e., for resource allocation of '111' and a shift of '−1', '1', or '2').

FIGS. 7A and 7B illustrate examples of resource grids 701 and 702 that support retuning for flexible resource allocation in accordance with aspects of the present disclosure. In some examples, resource grids 701 and 702 may be implemented by aspects of wireless communication system 100 and/or 200. As shown, resource grids 701 and 702 illustrate examples of uplink resource allocations indicated by a wideband RIV of a UL RA type (e.g., for PUSCH with CEModeA), and/or the use of a flexible starting PRB for a 2-PRB allocation (e.g., for PUSCH with CEModeB), respectively. In some aspects, resource grid 701 may illustrate uplink resource allocations for portions of 3/10/15/20 MHz bandwidths.

In some examples, a portion of allocated resources, RA 705, may be located outside a narrowband, such as NB 715-*a*. In some cases, NB 715-*a* may be an example of a narrowband of the system bandwidth, and may be predefined. In some examples, a tuning NB may be determined based on a portion of the resource allocation being located outside a narrowband. As shown in FIG. 7A, the portion of the allocated resources (i.e., RA 705) outside a narrowband may include one or more left edge RBs that are not included in NB 715-*a* of the system bandwidth. In FIG. 7A, left edge RBs may be used to refer to edge RBs at the lower end of the system bandwidth, while right edge RBs may be used to refer to edge RBs at the upper end of the system bandwidth. In such cases, the tuning NB (i.e., retuned NB 710) may be determined to start from a lowest RB of the system bandwidth. Further, as illustrated, the center frequency of retuned NB 710 may coincide with the center frequency of the communication utilizing RA 705.

As previously described, in some cases, if a center frequency used by a transmitter chain at the UE 115 for the subsequent communication coincides with the center of a newly defined retuning narrowband, additional interference may be introduced at the receiver end. For instance, a UE 115 utilizing the newly defined retuning narrowband, retuned NB 710, for uplink communications may cause additional interference at the base station 105 (e.g., in the form of mirror image interference 720) for transmissions from one or more other UEs 115 utilizing a different narrowband. As further described with reference to FIG. 7B, the center frequency of the subsequent communication may be adjusted to coincide with the center frequency of the resource allocation, RA 705. For example, the UE 115 may map frequency domain symbols to subcarriers in generating a time-domain signal and modify a radio frequency used by a mixer to generate the signal around the center frequency with the center frequency coinciding with the center frequency of the resource allocation. Selection of the center frequency of the second communication may be based on a coverage enhancement mode for the UE (e.g., CEModeA or CEModeB), a tuning time capability of the UE, a tuning configuration received from the base station, a reference signal configuration for the subsequent communication utilizing the RA 705, or a combination thereof.

As shown in FIG. 7B, a portion of allocated resources, RA 705, may be located outside a narrowband, such as NB 715-b. In some cases, NB 715-a may be an example of a narrowband of the system bandwidth, and may be predefined. In some examples, in order to mitigate mirror image interference at the receiver end, a UE may determine a center frequency of the communication utilizing the allocated resources to coincide with a center of the resource allocation.

In some cases, the UE may set the center frequency of the communication utilizing the allocated resources to coincide with the center of an allocation located narrowband (i.e., tuning NB) for PUSCH CEModeA, and to coincide with the center of the resource allocation for PUSCH CEModeB. In some other cases, UEs that have requested zero (or negligible) tuning time may utilize a center of the resource allocation for setting the center frequency of the communication, irrespective of the coverage enhancement mode. That is, if the UE 115 supports retuning between consecutive TTIs, this capability may be signaled to the base station, and the UE may retune its transmitter chain between each TTI in which it has an allocation (e.g., an allocation outside a configured narrowband or in a shifted narrowband) to place the center frequency in the center of the allocation. In some other examples, the UE may receive a tuning configuration for setting the center frequency of the communication from the base station via a unicast or broadcast transmission (e.g., system information (SI)). The tuning configuration may be UE-specific, or may be cell-specific (e.g., applies to all UEs in the cell).

In some cases, the tuning configuration may be dependent on whether a sounding reference signal (SRS) transmission is configured (e.g., for the TTI prior to retuning). In some cases, if the UE is scheduled to transmit an SRS, and the SRS transmission collides with the PUSCH retuning period, the UE may drop the SRS. When no SRS transmission is configured, the UE may receive a tuning configuration for setting the center frequency of the communication to coincide with the center of the resource allocation (e.g., instead of the center of the tuned narrowband). Additionally or alternatively, the tuning configuration may be dependent on the scheduled resource allocation. For example, if no frequency hopping is configured at the UE, and the resources are semi-statically scheduled, the UE may refrain from frequent retuning. Thus, the base station may configure the UE for setting the center frequency in the center of the resource allocation, Otherwise (e.g., where the resources are dynamically scheduled or the UE is configured for frequency hopping) the UE may be configured by the base station for setting the center frequency in the center of the tuning narrowband.

In some cases, the UE may retune its transceiver even if the tuning configuration is for setting the center frequency of the communication to coincide with the center of the scheduled RA. In some other cases, the UE may receive the tuning configuration from the base station for setting the center frequency of the communication to be the same as the center of the tuning band.

FIG. 8 illustrates an example of a resource grid 800 that supports retuning for flexible resource allocation in accordance with aspects of the present disclosure. In some examples, resource grid 800 may be implemented by aspects of wireless communication system 100, and illustrates examples of one or more puncturing and dropping rules utilized during retuning.

In some cases, carriers may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. In some cases, for TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. In some cases, a special subframe may be composed of three distinct portions: a Downlink Pilot Time Slot (DwPTS), a guard period (GP), and an Uplink Pilot Time Slot (UpPTS), each of which may have a configurable length. It should be noted that the sum of the lengths may be equal to the length of a normal subframe.

In the example of FIG. 8A, control channel 810 may occupy a portion of subframes 805-a and 805-b, and may be an example of an uplink control channel (e.g., PUCCH), or a downlink control channel (e.g., PDCCH). Further, MTC control channel 815 and shared channel 820 in subframe 805-a may represent a first resource allocation associated with NB 825. In some cases, shared channel 820 may be an uplink shared channel (e.g., PUSCH), or a downlink shared channel (e.g., PDSCH). In some cases, NB 825 may also be the associated tuning band for the first resource allocation. In some cases, a UE may also identify a second resource allocation (e.g., shared channel 820) in subframe 805-b. In some cases, and as described with reference to FIGS. 2-6, the UE may determine that a tuning narrowband, for example, retuned NB 830 (i.e., tuning band associated with the second resource allocation) is different from the first tuning band. In such cases, the UE may determine to perform retuning from the first tuning band to the second tuning band.

In some examples, the UE may also puncture one or more symbols from the second communication to account for the retuning time. For instance, the UE may establish a guard period between the two consecutive communications in subframes 805-a and 805-b, based in part on the retuning time. As shown in FIG. 8, one or more symbols may be punctured (i.e., punctured symbols 835) from control channel 810 in subframe 805-b. In some cases, one or two PDCCH symbols may be sufficient for retuning, and the UE may refrain from puncturing PDSCH or MPDCCH in the second subframe. In other cases, the UE may puncture one or more symbols from PDSCH or MPDCCH to account for the retuning time.

In some cases, on the UL, the UE may transmit a combination of periodic SRS and UL DMRS for link adaptation and demodulation, respectively. In some cases, DMRS may be contained at the beginning of a subframe and may be used by a base station for channel estimation, whereas the SRS may be deployed to assist a base station in estimating the uplink channel quality over a wider bandwidth. In some aspects, the base station may use this uplink channel quality information for uplink frequency selective scheduling. In other cases, SRS may also be used for uplink timing estimation as part of timing alignment procedure between the base station and the UE. In some examples, the UE may refrain from transmitting the SRS in the same PRBs where the PUSCH is transmitted, or even in the same subframe as the PUSCH (e.g., the UE may transmit the SRS in PRBs different from the PRBs where the PUSCH is transmitted, or in a subframe different from the subframe as the PUSCH).

For instance, in some cases, the SRS may be transmitted in a first subframe, and a PUSCH may be transmitted in the first subframe, and a subsequent, second subframe. In some cases, the UE may be configured for SRS transmissions (e.g., periodic or aperiodic) via RRC signaling, DCI, or any other type of control signaling. In some cases, in TDD, the SRS may be transmitted in uplink subframes, which may also be referred to as normal subframes, as well as special subframes (e.g., including an uplink pilot time slot (UpPTS)). In some cases, the UpPTS may primarily be utilized for SRS or RACH transmissions.

In one example, the UE may not be configured for SRS transmissions in the UpPTS, however, one or more resources may be allocated for SRS transmission in a first subframe, and for PUSCH transmission in the first and a second subframe. In some cases, the second subframe may be subsequent to the first subframe (e.g., the first subframe may be a subframe N, and the second subframe may be a subframe N+1). In some cases, if the tuning bands for PUSCH in the first and second subframes are different, the UE may proceed to drop SRS in the first normal subframe. In some other cases, the tuning bands for PUSCH in the first and second subframes may be the same, but SRS may still be dropped, for example, if at least a portion of the SRS is outside the tuning band.

In some cases, the UE may be configured for SRS transmissions in the UpPTS, and the SRS may be transmitted in an uplink (or normal) subframe. In such cases, if the SRS in the first subframe is not entirely within the retuning band for PUSCH in the second subframe, the UE may perform retuning from the first tuning band (e.g., a narrowband of the system bandwidth for carrying the SRS) to the retuning band. In some examples, the UE may establish a guard period between the two consecutive uplink transmissions, which may be based in part on the retuning time. In some cases, establishing the guard period may include puncturing one or more symbols of the second communication based on the retuning. As shown in FIG. 8, one or more symbols may be punctured (i.e., punctured symbols 835) from control channel 810 in subframe 805-b.

In some other cases, in TDD, the SRS may be configured to be transmitted in the UpPTS of a subframe, such as a special subframe, while resources may be allocated for PUSCH transmission in a second subframe. In some cases, if the UE is not configured for SRS transmissions in the UpPTS, and the SRS is not completely within the second tuning band for PUSCH, the UE may refrain from transmitting the SRS (i.e., drop SRS) in the first subframe.

In other cases, if the UE is configured for SRS transmissions in the UpPTS, the UE may perform retuning from the first tuning band (e.g., a narrowband of the system bandwidth for carrying the SRS) to the retuning band. In some examples, the UE may establish a guard period between the two consecutive uplink transmissions, which may be based in part on the retuning time.

In some cases, the UE may identify a resource allocation for a downlink data transmission (e.g., PDSCH) in a DwPTS in a special subframe, and may identify another resource allocation for SRS transmission in UpPTS of the same special subframe. In some cases, the two resource allocations may be associated with different tuning bands, and the UE may refrain from transmitting the SRS if a portion of the SRS is outside the first tuning band of PDSCH in DwPTS. In some other cases, the UE may be configured for SRS transmissions in the UpPTS, and may not drop SRS even if a portion of the SRS is outside the first tuning band. In such cases, the UE may establish a guard period, in addition to retuning from the first tuning band to the second tuning band (i.e., retuning band of SRS).

Figure 9:
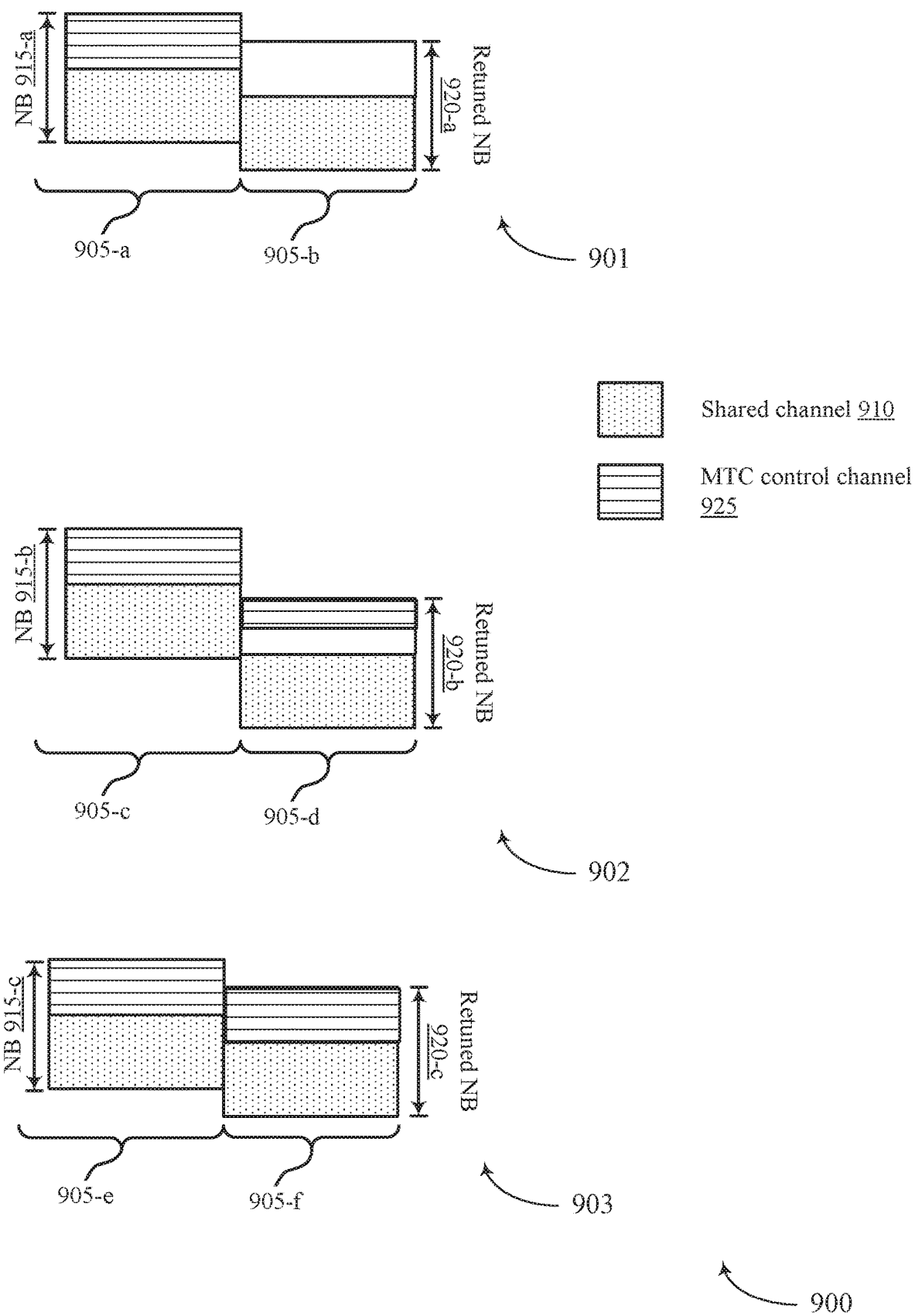
FIG. 9 illustrates an example of a resource grid that supports retuning for flexible resource allocation in accordance with aspects of the present disclosure.

FIG. 9 illustrates examples 900 of resource grids 901 through 903 that support retuning for flexible resource allocation in accordance with aspects of the present disclosure. In some examples, resource grids 901 through 903 may be implemented by aspects of wireless communication systems 100 and/or 200.

In some cases, a UE may be configured to monitor a control channel within a narrowband. As illustrated in resource grid 901, the UE may be configured to monitor MTC control channel 925 occupying a portion of NB 915-a in subframe 905-a. Broadly, a base station transmitting control information to a UE may configure search space sets according to control channel candidates (e.g., PDCCH candidates) to use for control channel transmissions. When configuring a search space set, the base station may determine a control resource set (CORESET) containing the search space set. This CORESET may include a number of control channel elements (CCEs) and the search space set may be mapped to a CCE space corresponding to a subset of CCEs of the CORESET. The base station may identify control channel candidates to allocate at each aggregation level for the search space set, and may assign positions for the control channel candidates within the CCE space according to a hash function. The UEs may identify this search space set configuration, and may monitor the CCEs corresponding to the hashed control channel candidates for any DCI transmissions from the base station.

As illustrated in subframe 905-a of resource grid 901, the UE may be configured to monitor MTC control channel 925 and receive downlink transmissions over shared channel 910 concurrently (e.g., in the same subframe). In some cases, and as shown in resource grid 901, a portion of the resource allocation for shared channel 910 in subframe 905-b may be outside NB 915-a (e.g., tuning NB 920-a may be shifted by 1 PRB, relative to NB 915-a). In such cases, the tuning band associated with the resource allocation (i.e., tuning NB 920-a) may be identified according to the techniques described herein. In some examples, the UE may refrain from monitoring MPDCCH if the tuning NB 920-a is different from NB 915-a.

Alternatively, as shown in resource grid 901, the UE may monitor a portion of the MTC control channel of NB 915-a that overlaps with the tuning NB 920-a. That is, the UE may monitor MPDCCH candidates that are included within the portion of the MTC control channel of NB 915-a that overlap with the tuning NB 920-a.

As shown in resource grid 902, a UE may be configured for NB 915-b in subframe 905-c, which may include a configured MTC control channel 925. A portion of the resource allocation for shared channel 910 in subframe 905-d may be outside NB 915-b (e.g., tuning NB 920-b may be shifted by 2 PRBs or 3 PRBs relative to NB 915-b). In such cases, the tuning band associated with the resource allocation (i.e., tuning NB 920-b) may be identified according to the techniques described herein. In this instance, there may be no overlap between the MTC control channel 925 in subframe 905-c and the retuning band (e.g., tuning NB 920-b) for subframe 905-d. Thus, whether or not the UE is configured to monitor portions of the MTC control channel overlapping with the tuning NB, the UE may refrain from monitoring the MPDCCH in subframe 905-*d* (e.g., subframes where the tuned NB based on a NB shift does not overlap with the MPDCCH for a non-shifted NB).

Alternatively, as shown in resource grid 903, the UE may be configured to monitor a control channel within the tuning NB (e.g., shift the control channel from the control channel allocation in the non-shifted NB). For example, the UE may be configured for NB 915-*c* (e.g., non-shifted NB) in subframe 905-*e*, which may include a configured MTC control channel 925. A portion of the resource allocation for shared channel 810 in subframe 905-*f* may be outside NB 915-*c* (e.g., tuning NB920-*c* may be shifted by 1 PRB, 2 PRBs or 3 PRBs relative to NB 915-*b*). The UE may monitor an adjusted MTC control channel 925 within the tuning NB 920-*c* for subframe 905-*f*. In some cases, MTC control channel 925 may be adjusted based in part on a relative offset of the tuning NB 920-*c* to the first narrowband (e.g., NB 915-*c*). In some aspects, tuning NBs 920-*a* through 920-*c* may also be referred to as retuned NBs 920-*a* through 920-*c*.

Figure 10:
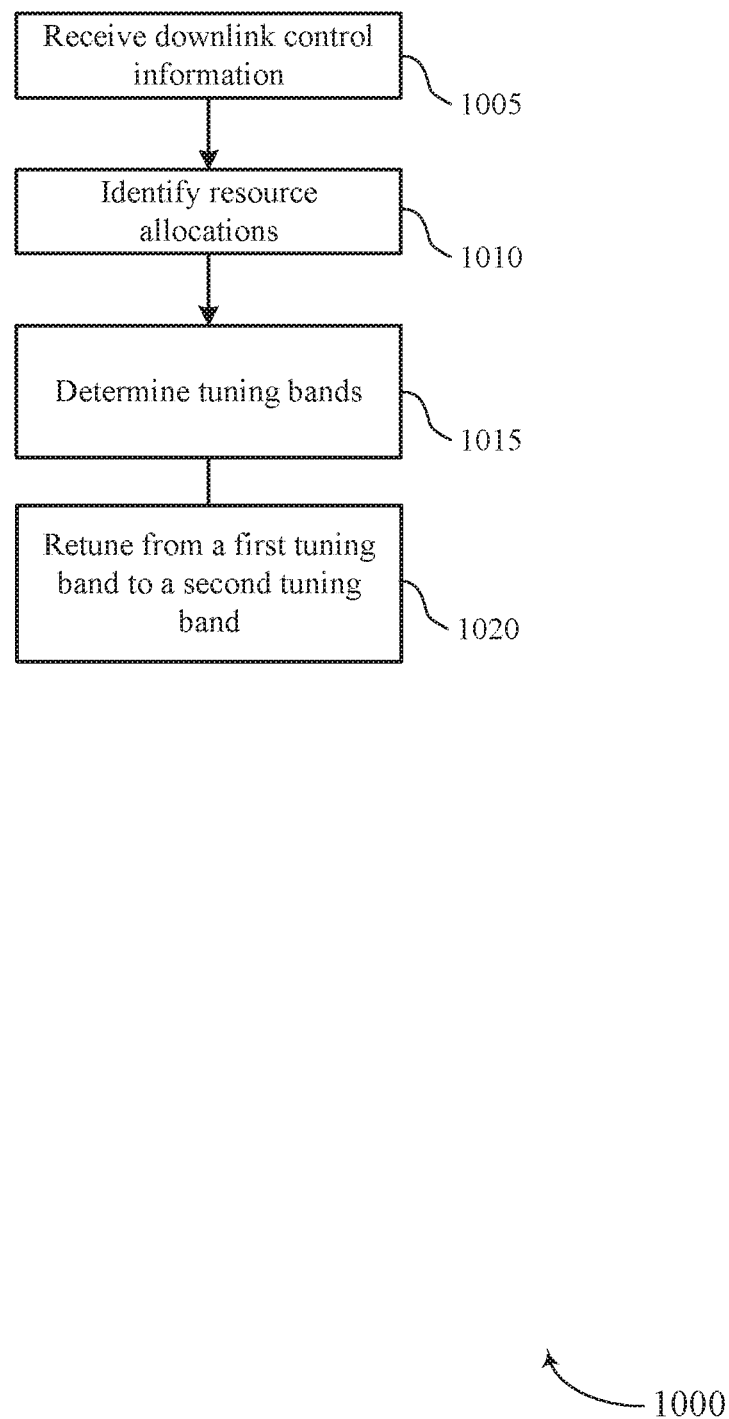
FIG. 10 shows an example flowchart that supports retuning for flexible resource allocation in accordance with aspects of the present disclosure.

FIG. 10 shows an example flowchart 1000 that supports retuning for flexible resource allocation in accordance with aspects of the present disclosure. The flowchart 1000 may implement aspects of the wireless communications systems 100 and 200. The flowchart 1000 may be performed by a wireless device, such as a UE 115 or UE 115-*a* as described herein. In some examples, the flowchart 1000 may illustrate a scheme that enables the wireless device to perform retuning for flexible resource allocation, supportive of frequency hopping or frequency diversity in transmissions, while maintaining reliable performance.

At 1005, the wireless device may receive downlink control information transmitted from a base station. The downlink control information may include a narrowband index (e.g., indicative of narrowband shifts) and resource indication values (e.g., indicative of resource allocations). In some examples, the downlink control information may include a narrowband index for downlink resource allocations, without a narrowband index for uplink resource allocations. The downlink control information may indicate a first resource allocation, a second resource allocation, or both. In some examples, the downlink control information may indicate a tuning configuration.

At 1010, the wireless device may identify a first resource allocation (e.g., first RA 210*a* of FIG. 2) for a first communication in a first TTI (e.g., a subframe 'N') and a second resource allocation (e.g., second RA 210*b* of FIG. 2) for a second communication in a second, subsequent TTI (e.g., a subframe 'N'). In some aspects, the first resource allocation (e.g., first RA 210*a* of FIG. 2) may be associated with a first narrowband (e.g., NB 215 of FIG. 2) and the second resource allocation (e.g., second RA 210*b* of FIG. 2) may be associated with a second narrowband (e.g., tuning NB 218 of FIG. 2). In an example, in identifying the first resource allocation and the second resource allocation, the UE may identify a set of resource blocks allocated for the first communication at subframe 'N' and identify a set of resource blocks allocated for the second communication at subframe 'N+1'. In an example, a portion of the first resource allocation may be located outside the first narrowband, or a portion of the second resource allocation may be located outside the second narrowband. In some examples, the first and second communications may be downlink or uplink communications.

At 1015, the wireless device may determine a first tuning band associated with the first resource allocation for the first TTI, and a second tuning band associated with the second resource allocation for the second TTI. In some aspects, the wireless device may determine the tuning bands (e.g., the second tuning band) based on resource allocations and resource block groups for a system bandwidth. For example, the wireless device may determine resource block groups associated with resource blocks of the second resource allocation for the second TTI. Accordingly, the wireless device may define or determine the second tuning band based on an alignment between starting or ending resource blocks and a boundary of a resource block group, for example, as described in FIGS. 3A and 3B. At 1015, in an example, the wireless device may determine the first tuning band is different from the second tuning band.

At 1020, the wireless device may retune from the first tuning band to the second tuning band. In some aspects, the wireless device may retune from the first tuning band to the second tuning band between the first communication (e.g., at subframe 'N') and the second communication (e.g., at subframe 'N+1'). In an example, the wireless device may determine whether to retune between the first communication and the second communication, based on whether a narrowband containing the resource allocation changes between the subframes (e.g., based on the second resource allocation). Accordingly, the UE may retune from using the resource blocks allocated for the first communication to using the resource blocks allocated for the second communication.

In some aspects, the wireless device may set the center frequency associated with the second communication to coincide with a center of the second tuning band. In an example, the wireless device may set the center frequency associated with the second communication to coincide with a center of the second resource allocation (e.g., as described in FIG. 7B, where the center frequency of UL using the retuned NB coincides with the center of the resource allocation, RA 705, at allocation 2). In some examples, the wireless device may retune between consecutive TTIs or subframes (e.g., subframes N and N+1 as described in FIG. 2). In an example, during retuning, the wireless device may refrain from communicating with the base station or other wireless devices.

Figure 11:
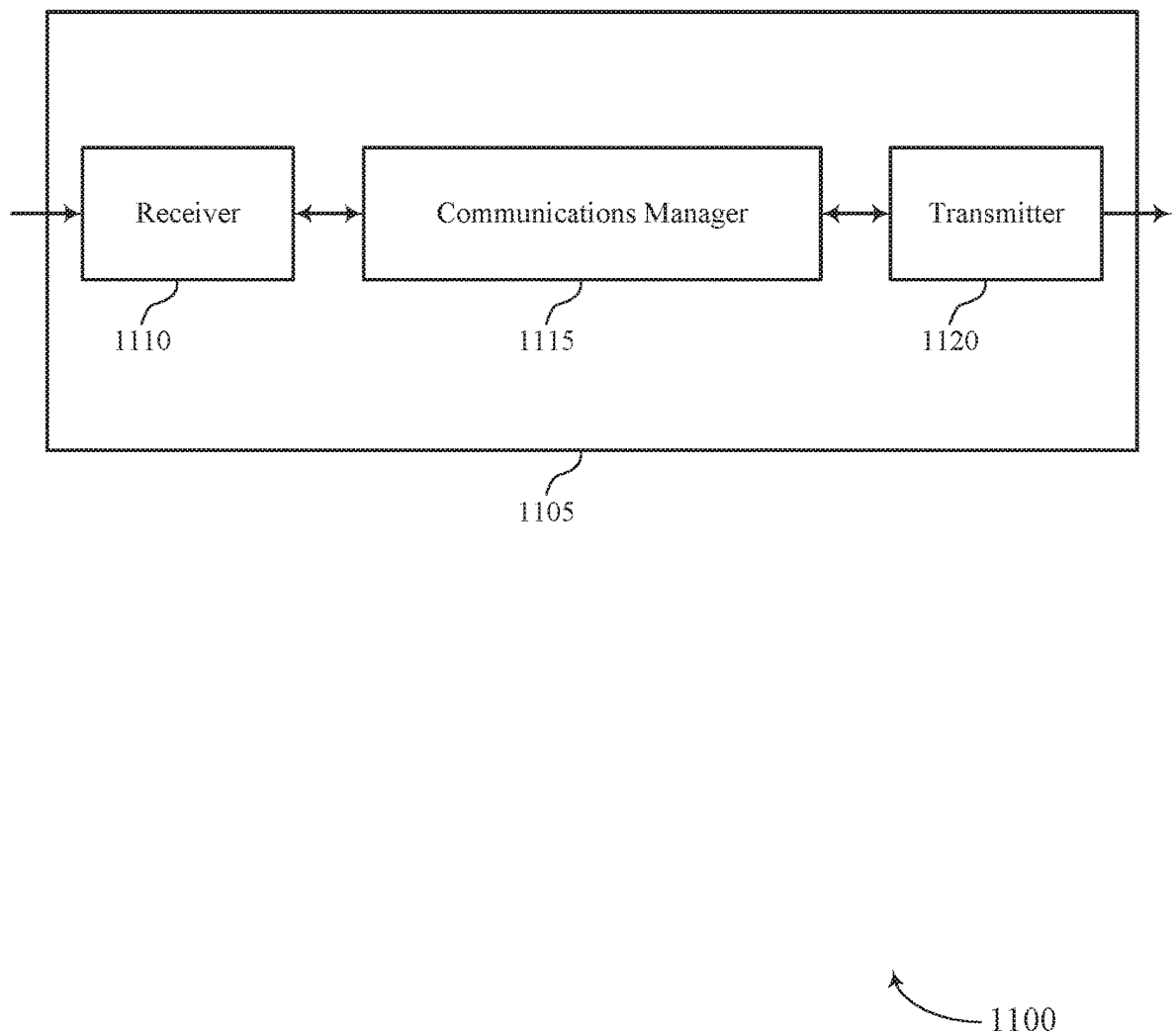
FIGS. 11 and 12 show block diagrams of devices that support retuning for flexible resource allocation in accordance with aspects of the present disclosure.

FIG. 11 shows a block diagram 1100 of a device 1105 that supports retuning for flexible resource allocation in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to retuning for flexible resource allocation, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify, at a UE, a first resource allocation for a first communication in a first TTI and a second resource allocation for a second communication in a second, subsequent TTI, where the first resource allocation is associated with a first narrowband and the second resource allocation is associated with a second narrowband, and where a portion of the first resource allocation is located outside the first narrowband or a portion of the second resource allocation is located outside the second narrowband, determine that a first tuning band associated with the first resource allocation for the first TTI is different from a second tuning band associated with the second resource allocation for the second TTI, and retune from the first tuning band to the second tuning band between the first communication and the second communication based on the determining. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
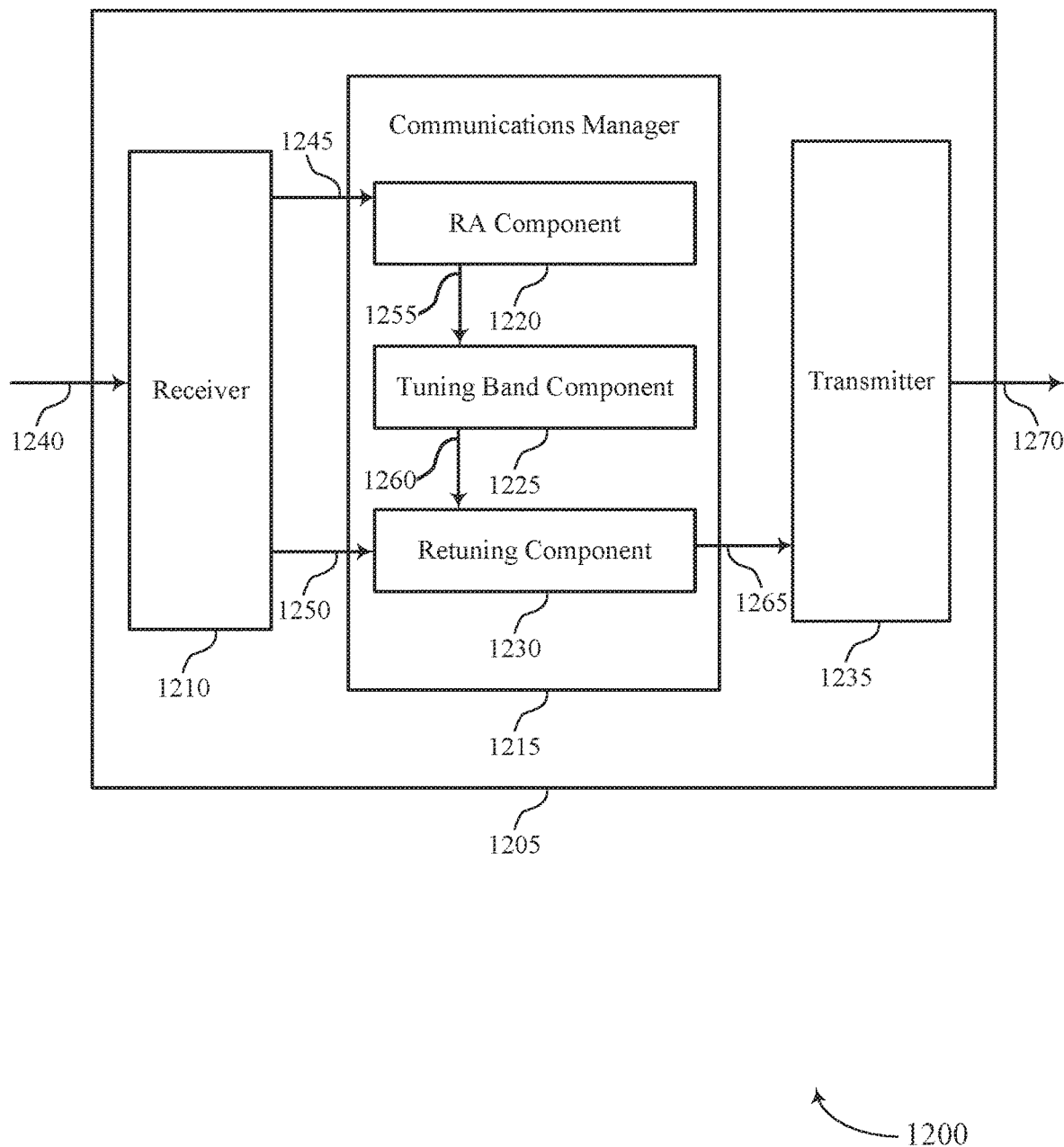

FIG. 12 shows a block diagram 1200 of a device 1205 that supports retuning for flexible resource allocation in accordance with aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information 1240 such as packets, user data, or control information associated with various information channels (e.g., control channels, data channels, and information related to retuning for flexible resource allocation, etc.). The information 1240 may include downlink control information transmitted from a base station 105. The downlink control information may indicate a first resource allocation (e.g., first RA 210*a* of FIG. 2), a second resource allocation (e.g., a second RA 210*b* of FIG. 2), or both. In some examples, the downlink control information may indicate a tuning configuration. The information 1240 may be passed on to other components of the device 1205. For example, the receiver 1210 may electrically send information received from another device (e.g., a base station 105), such as downlink control information (e.g., a narrowband index associated with downlink or uplink resource allocations, an RIV for a resource allocation), and the like, to the communications manager 1215. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a RA component 1220, a tuning band component 1225, and a retuning component 1230. The communications manager 1215 may be an example of aspects of the communications manager 1410 described herein.

The RA component 1220 may identify, at a UE, a first resource allocation for a first communication in a first TTI and a second resource allocation for a second communication in a second, subsequent TTI, where the first resource allocation is associated with a first narrowband and the second resource allocation is associated with a second narrowband, and where a portion of the first resource allocation is located outside the first narrowband or a portion of the second resource allocation is located outside the second narrowband. For example, the RA component 1220 may receive, from the receiver 1210, resource allocation information 1245 indicating RIV values (e.g., indicative of resource allocations and resource blocks in the resource allocations), for example, RIVs 21 to 25 as described in FIG. 3A. The resource allocation information 1245 may include a set of bits indicative of the resource allocations and associated resource blocks. The RA component 1220 may determine starting resource blocks of a narrowband (e.g., the first and second narrowbands), the number of resource blocks in the resource allocations, and RBG boundaries associated with the narrowband, based on the RIV values indicated by the resource allocation information 1245, and may output allocation information 1255 indicating the resource allocations and resource blocks to the tuning band component 1225. The allocation information 1255 may include a set of bits indicating the resource allocations.

The tuning band component 1225 may determine that a first tuning band associated with the first resource allocation for the first TTI is different from a second tuning band associated with the second resource allocation for the second TTI. For example, the tuning band component 1225 may receive the allocation information 1255 indicating the resource allocations, and may determine a center frequency of the second communication (e.g., an uplink communication) based on a coverage enhancement mode for the device 1205, a tuning time capability of the device 1205, the tuning configuration (e.g., received from the base station 105), a reference signal configuration for the second communication, or a combination thereof. The tuning band component 1225 may output frequency information 1260 to the retuning component 1230 indicating the center frequency of the second communication. The frequency information 1260 may include a set of bits indicating the center frequency and the associated resource allocation. For example, the frequency information 1260 may indicate setting the center frequency associated with the second communication to coincide with a center of the second resource allocation (e.g., as described in FIG. 7B, where the center frequency of UL using the retuned NB coincides with the center of the resource allocation, RA 705, at allocation 2).

The retuning component 1230 may retune from the first tuning band to the second tuning band between the first communication and the second communication based on the determining. The retuning component 1230 may receive, from the receiver 1210, a narrowband shift 1250. The narrowband shift 1250 may include a set of bits indicating the shift amount and the associated resource allocations. The retuning component 1230 may determine a starting RB and an ending RB of the second narrowband (e.g., as described in FIGS. 6A and 6B) based on the narrowband shift 1250 and the frequency information 1260 (e.g., indicating the center frequency of the second communication). The retuning component 1230 may pass retuning information 1265 indicating retuning information to other components of the device 1205 for processing. The retuning information 1321 may include a set of bits indicating whether to retune from the first tuning band to the second tuning band. In some cases, the retuning component 1230 may pass the retuning information 1265 (or other information based on the retuning information included in the retuning information 1265) to the transmitter 1235.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas. In an example, the transmitter 1235 may receive retuning information 1265 (e.g., starting RB and an ending RB of the second narrowband) for transmission and may identify time-frequency resources over which the information is to be transmitted. The transmitter 1235 may modulate the information over the identified time-frequency resources in order to transmit the signal 1270.

Figure 13:
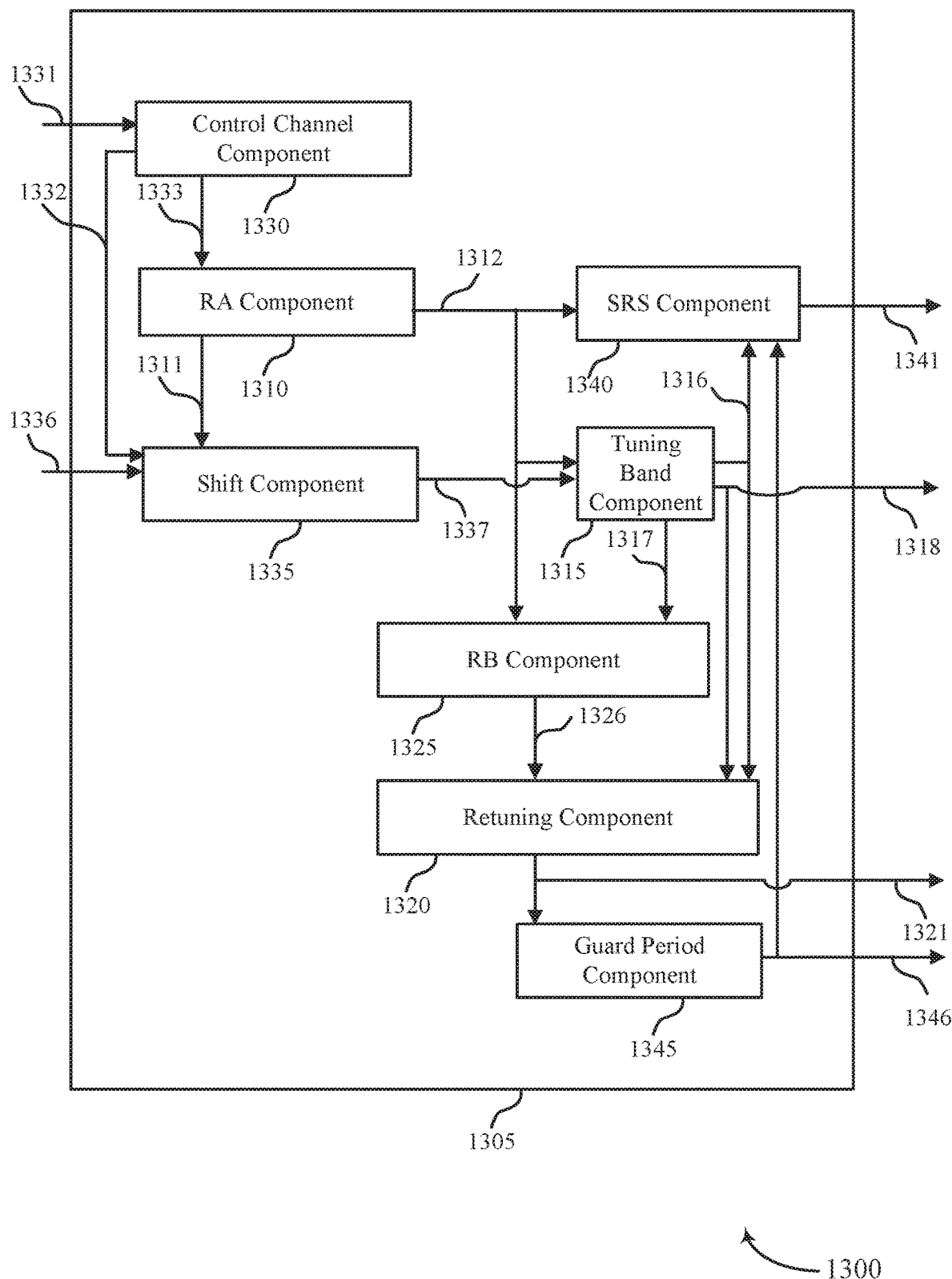
FIG. 13 shows a block diagram of a communications manager that supports retuning for flexible resource allocation in accordance with aspects of the present disclosure.

FIG. 13 shows a block diagram 1300 of a communications manager 1305 that supports retuning for flexible resource allocation in accordance with aspects of the present disclosure. The communications manager 1305 may be an example of aspects of a communications manager 1115, a communications manager 1215, or a communications manager 1410 described herein. The communications manager 1305 may include a RA component 1310, a tuning band component 1315, a retuning component 1320, a RB component 1325, a control channel component 1330, a shift component 1335, a SRS component 1340, and a guard period component 1345. Each of these modules may communicate, directly or indirectly, with one another (e.g., via one or more buses).

The RA component 1310 may identify, at a UE, a first resource allocation (e.g., first RA 210a of FIG. 2) for a first communication in a first TTI and a second resource allocation (e.g., second RA 210b of FIG. 2) for a second communication in a second, subsequent TTI, where the first resource allocation is associated with a first narrowband (e.g., NB 215 of FIG. 2) and the second resource allocation is associated with a second narrowband (e.g., tuning NB 218 of FIG. 2), and where a portion of the first resource allocation is located outside the first narrowband or a portion of the second resource allocation is located outside the second narrowband. In some aspects, the RA component 1310 may receive resource allocation information 1333 from the control channel component 1330 indicating resource allocations and resource blocks in the resource allocations. In some examples, the resource allocation information 1333 may include RIV values indicative of the resource allocations and the resource blocks in the resource allocations. In some aspects, the RA component 1310 may output allocation information 1312 to one or more of the SRS component 1340, the tuning band component 1315, and the RB component 1325, where the allocation information 1312 may indicate the first resource allocation for the first TTI and the second resource allocation for the second TTI. The allocation information 1312 may include a set of bits indicating the resource allocations.

The tuning band component 1315 may determine that a first tuning band associated with the first resource allocation for the first TTI is different from a second tuning band associated with the second resource allocation for the second TTI. In some aspects, the tuning band component may receive the allocation information 1312 from the RA component 1310 indicating the first resource allocation for the first TTI and the second resource allocation for the second TTI.

In some examples, the tuning band component 1315 may determine the second tuning band based on the second resource allocation and a set of RBGs for the system bandwidth. In some aspects, the tuning band component 1315 may receive, in the allocation information 1312, an indication of starting or ending resource blocks of a narrowband (e.g., the first and second narrowbands), the number of resource blocks in the resource allocations, and RBG boundaries associated with the narrowband (e.g., based on the RIV values). In some aspects, the tuning band component 1315 may receive shift information 1337 from the shift component 1335 which may indicate a shift of the second resource allocation relative to the second narrowband. The shift information 1337 may include a set of bits indicating the shift amount and the associated resource allocation.

The tuning band component 1315 may output tuning band comparison information 1316 to one or more of the SRS component 1340 or the retuning component 1320 indicating whether the first tuning band is different from the second tuning band. The tuning band comparison information 1316 may include a set of bits indicating whether the first tuning band is different from the second tuning band and an associated difference amount. In some aspects, the tuning band component 1315 may output the second resource allocation 1317 to the RB component 1325 (e.g., RBs included in the second resource allocation, starting and ending RBs). The resource allocation 1317 may include a set of bits indicating the second resource allocation and RBs associated with the second resource allocation. The RB component 1325 may also identify boundaries of RBGs of the set of RBGs.

In some examples, the tuning band component 1315 may output frequency information 1318 indicating the center frequency of the second communication. In an example, the tuning band component 1315 may output the frequency information 1318 to one or more of the retuning component 1320 or the transmitter 1235. The frequency information 1318 may indicate setting the center frequency associated with the second communication to coincide with a center of the second resource allocation. The frequency information 1318 may include a set of bits indicating the center frequency and the associated resource allocation.

In some examples, the tuning band component 1315 may determine the second tuning band to start from a lowest RB of the system bandwidth when the portion of the second resource allocation located outside the second narrowband includes one or more edge RBs at a lower end of the system bandwidth that are not included in a narrowband of the system bandwidth.

In some examples, the tuning band component 1315 may determine the second tuning band to end at a highest RB of the system bandwidth when the portion of the second resource allocation outside the second narrowband includes one or more edge RBs at an upper end of the system bandwidth that are not included in a narrowband of the system bandwidth.

In some examples, the tuning band component 1315 may determine the second tuning band to start from a lowest RB of the second resource allocation when the portion of the second resource allocation outside the second narrowband is exclusive of one or more edge RBs at a lower end or an upper end of the system bandwidth that are not included in a narrowband of the system bandwidth. In some examples, the tuning band component 1315 may determine the second tuning band to start at a starting RB of the second resource allocation, or end at an ending RB of the second resource allocation.

In some examples, the tuning band component 1315 may determine the second tuning band based on the shift.

In some cases, the first tuning band corresponds to the first narrowband.

In some cases, the second tuning band corresponds to the second narrowband.

In some cases, the second tuning band starts at a starting RB of the second resource allocation.

In some cases, the second tuning band ends at an ending RB of the second resource allocation.

In some cases, each of the first and second tuning bands are composed of continuous frequency resources having a same size as the first or the second narrowband.

In some cases, the first narrowband and the second narrowband correspond to a common narrowband.

In some cases, the first tuning band corresponds to the common narrowband.

In some cases, the first narrowband is different from the second narrowband.

In some examples, the tuning band component 1315 may determine a center frequency of the second communication based on a coverage enhancement mode for the UE, a tuning time capability of the UE, a tuning configuration received from a base station, a reference signal configuration for the second communication, or a combination thereof. In some examples, the second communication may include an uplink communication. In some cases, the coverage enhancement mode for the UE is one of a first coverage enhancement mode associated with a first amount of repetition (e.g., PUSCH CEModeA), or a second coverage enhancement mode associated with a second, larger amount of repetition (e.g., PUSCH CEModeB).

In some examples, determining the center frequency of the second communication includes setting the center frequency associated with the second communication to coincide with a center of the second tuning band, or setting the center frequency associated with the second communication to coincide with a center of the second resource allocation. In some aspects, setting the center frequency associated with the second communication may also be performed in conjunction with the retuning component 1320.

The retuning component 1320 may retune from the first tuning band to the second tuning band between the first communication and the second communication based on the determining that a first tuning band associated with the first resource allocation for the first TTI is different from a second tuning band associated with the second resource allocation for the second TTI. In some examples, the retuning component 1320 may receive resource block information 1326 from the RB component 1325 indicating one or more of the starting RB or the ending RB of the second tuning band. The resource block information 1326 may include a set of bits indicating positions of the RBs of the second tuning band. In some examples, the retuning component 1320 may receive the tuning band comparison information 1316 from the tuning band component 1315 indicating whether the first tuning band is different from the second tuning band. In some aspects, the retuning component 1320 may receive the frequency information 1318 from the tuning band component 1315 indicating the center frequency of the second communication. In an example, the retuning component 1320 may output retuning information 1321 indicating the retuning from the first tuning band to the second tuning band between the first communication and the second communication. The retuning information 1321 may include a set of bits indicating whether to retune from the first tuning band to the second tuning band. In some aspects, the retuning component 1320 may output the retuning information 1321 to the guard period component 1345 or to the transmitter 1235.

The RB component 1325 may determine a starting RB of the second tuning band based on an alignment of a starting RB of the second resource allocation with a boundary of an RBG of the set of RBGs. The RB component 1325 may receive the allocation information 1312 from the RA component indicating the first resource allocation for the first TTI and the second resource allocation for the second TTI. In some aspects, the RB component 1325 may receive the second resource allocation 1317 from the tuning band component 1315 indicating the second resource allocation (and RBs included in the second resource allocations) and boundaries of RBGs of the set of RBGs.

In some examples, the RB component 1325 may determine an ending RB of the second tuning band based on an alignment of an ending RB of the second resource allocation with a boundary of an RBG of the set of RBGs.

In some aspects, the RB component 1325 may output resource block information 1326 to the retuning component 1320 indicating one or more of the starting RB or the ending RB of the second tuning band.

The control channel component 1330 may receive, from a base station (e.g., via the receiver 1210), information 1331 such as packets, user data, or control information associated with various information channels (e.g., control channels, data channels, and information related to retuning for flexible resource allocation, etc.). In an example, the information 1331 may include control information indicating the first resource allocation, the second resource allocation, or both. In some examples, the control channel component 1330 may receive, from a base station, a tuning configuration in a unicast or broadcast transmission (e.g., using SI). The tuning configuration may be included in the information 1331.

In some examples, identifying the second resource allocation includes receiving control information in a TTI prior to the second TTI, the control information including a grant for the second resource allocation.

In some examples, the control channel component 1330 may refrain from monitoring the control channel in the second TTI based on determining that at least a portion of the control channel does not overlap with the second tuning band.

In some examples, the control channel component 1330 may identify a portion of the control channel within the first narrowband that overlaps in frequency with the second tuning band.

In some examples, the control channel component 1330 may monitor, in the second TTI, the portion of the control channel for control information.

In some examples, the control channel component 1330 may monitor an adjusted control channel in the second TTI for control information, the adjusted control channel being adjusted based on a relative offset of the second tuning band to the first narrowband.

In some cases, the UE is configured for monitoring a control channel within the first narrowband.

In some aspects, the control channel component 1330 may output narrowband information 1332 to the shift component 1336 indicating aspects of the first or second narrowband (e.g., a shift of the second narrowband with respect to the first narrowband). The narrowband information 1332 may include a set of bits indicating the shift of the second narrowband with respect to the first narrowband.

In some aspects, the control channel component 1330 may output resource allocation information 1333 to the RA component 1310 indicating resource allocations and resource blocks in the resource allocations. In some examples, the resource allocation information 1333 may include RIV values 1245 indicative of the resource allocations and the resource blocks in the resource allocations. The resource allocation information 1333 may include a set of bits indicative of the resource allocations and associated resource blocks.

The shift component 1335 may receive one or more bits indicating a shift of the second narrowband. In some examples, the shift component 1335 may receive one or more bits indicating a shift of the second resource allocation relative to the second narrowband. For example, the shift component 1335 may receive narrowband information 1332 indicating aspects of the second narrowband and allocation information 1311 indicating resource allocations and resource blocks associated with the resource allocations. In some examples, the shift component 1335 may pass information (e.g., shift information 1337) indicative of the shift in the resource allocation relative to the second narrowband to the tuning band component 1315.

The SRS component 1340 may identify a configuration for transmitting a SRS in the first TTI. In an example, the SRS component 1340 may receive tuning band comparison information 1316 from the tuning band component 1315 indicating whether the first tuning band is different from the second tuning band. In an example, the SRS component 1340 may output SRS transmission information 1341 (e.g., to the transmitter 1235) indicating whether to transmit the SRS or refrain from transmitting the SRS. In an example, the SRS transmission information 1341 may include an indication of a configuration for transmitting the SRS in the first TTI. The SRS transmission information 1341 may include a set of bits indicating whether to transmit the SRS and configurations for transmitting the SRS.

In some examples, the SRS component 1340 may refrain from transmitting the SRS based on determining the first tuning band is different from the second tuning band.

In some examples, the SRS component 1340 may identify, from the tuning band component 1315 or the guard period component 1345, a configuration for transmitting a SRS in the first TTI, where a portion of the SRS is outside the second tuning band.

In some examples, the SRS component 1340 may refrain from transmitting the SRS based on identifying that the portion of the SRS is outside the second tuning band.

In some examples, the SRS component 1340 may identify a configuration for a SRS in the first TTI, where a portion of the SRS is outside the second tuning band.

In some examples, the SRS component 1340 may receive guard information 1346 output by the guard period component 1345 indicating a guard period established between the first communication in the first TTI and the second communication in the second TTI. In some aspects, the SRS component 1340 may transmit the SRS (e.g., the SRS transmission information 1341 indicating a configuration for transmitting a SRS) based on the established guard period.

The guard period component 1345 may establish a guard period between the first communication in the first TTI and the second communication in the second TTI.

In some examples, the guard period component 1345 may output guard information 1346 indicating a guard period between the first communication in the first TTI and the second communication in the second TTI. In an example, the guard period component 1345 may output the guard information 1346 to the SRS component 1340. The guard information 1346 may include a set of bits indicating the duration of the guard period.

In some examples, the guard period component 1345 may puncture one or more symbols of the second communication based on the retuning. For example, the guard period component 1345 may puncture one or more symbols of the second communication based on the retuning information 1321 received from the retuning component 1320, which may indicate the retuning from the first tuning band to the second tuning band between the first communication and the second communication.

In some cases, the puncturing is based on determining that the first and second communications are downlink communications.

In some cases, the puncturing is based on determining that the first communication is an uplink communication and the second communication is a downlink communication.

Figure 14:
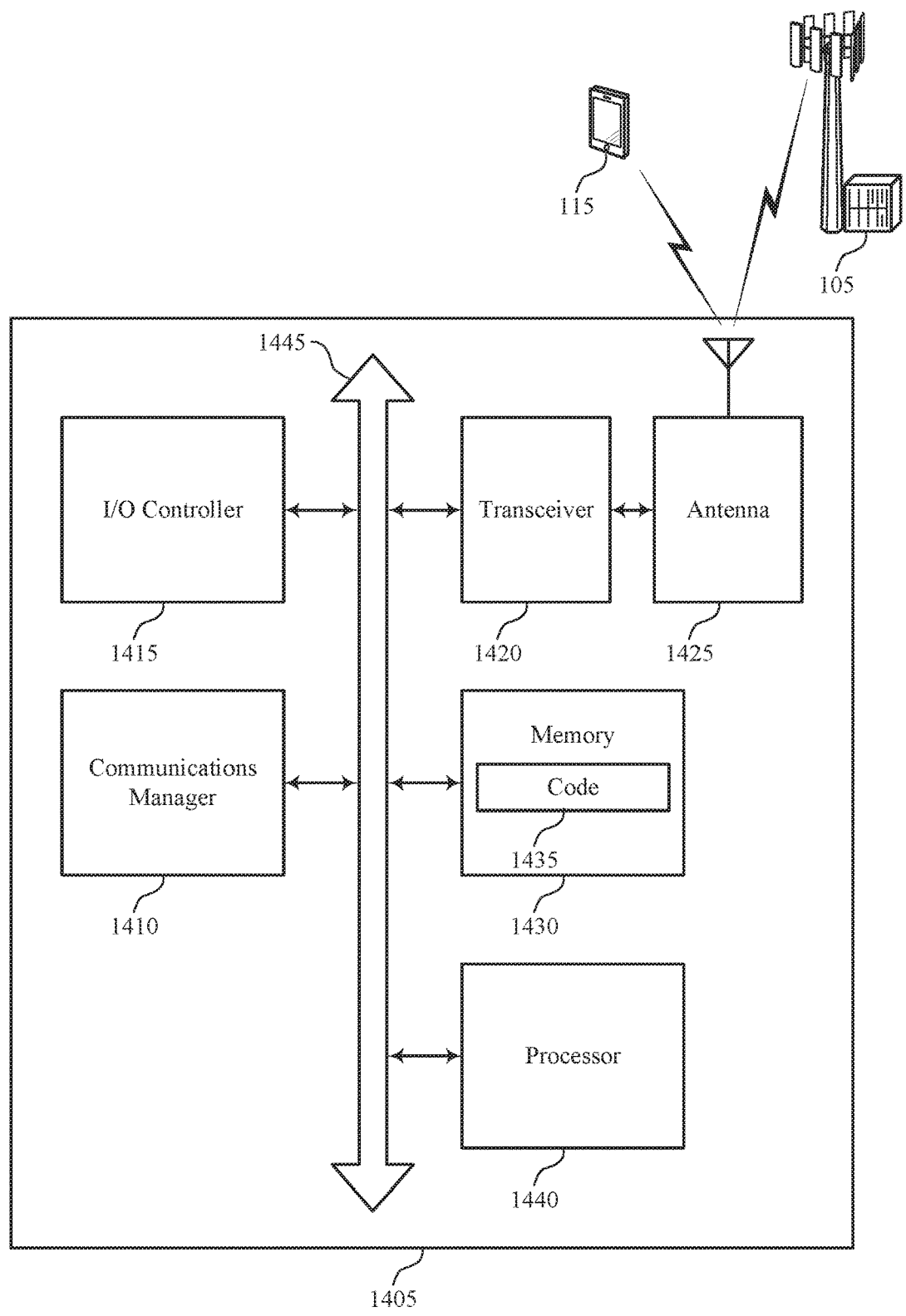
FIG. 14 shows a diagram of a system including a device that supports retuning for flexible resource allocation in accordance with aspects of the present disclosure.

FIG. 14 shows a diagram of a system 1400 including a device 1405 that supports retuning for flexible resource allocation in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may identify, at a UE, a first resource allocation for a first communication in a first TTI and a second resource allocation for a second communication in a second, subsequent TTI, where the first resource allocation is associated with a first narrowband and the second resource allocation is associated with a second narrowband, and where a portion of the first resource allocation is located outside the first narrowband or a portion of the second resource allocation is located outside the second narrowband, determine that a first tuning band associated with the first resource allocation for the first TTI is different from a second tuning band associated with the second resource allocation for the second TTI, and retune from the first tuning band to the second tuning band between the first communication and the second communication based on the determining.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting retuning for flexible resource allocation).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
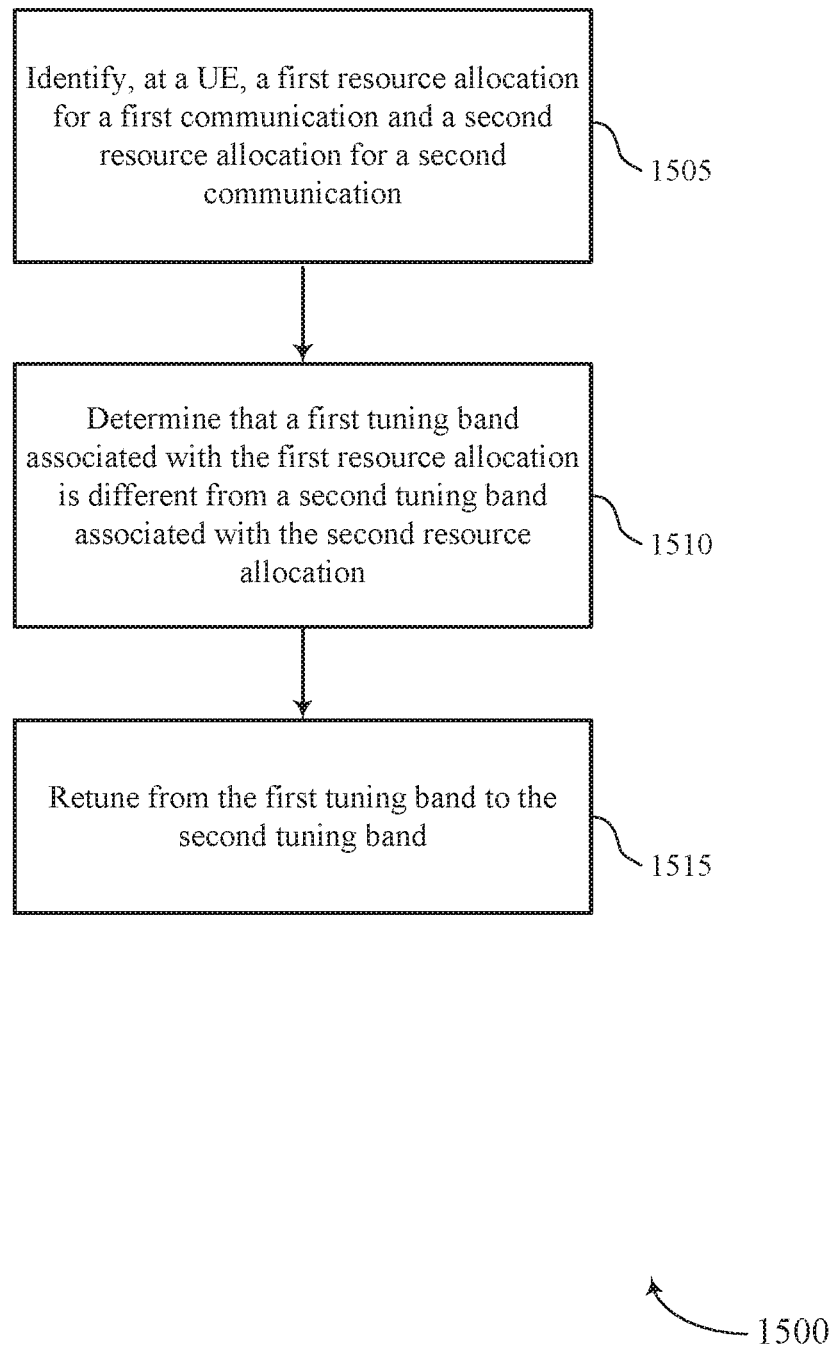
FIG. 15 shows a flowchart illustrating methods that support retuning for flexible resource allocation in accordance with aspects of the present disclosure.

FIG. 15 shows a flowchart illustrating a method 1500 that supports retuning for flexible resource allocation in accordance with aspects of the present disclosure. The operations of method 1500 may be implemented by a UE 115 or its components as described herein. For example, the operations of method 1500 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1505, the UE may identify a first resource allocation for a first communication and a second resource allocation for a second communication. In an example, the UE may identify a first resource allocation for a first communication in a first TTI (e.g., a subframe 'N') and a second resource allocation for a second communication in a second, subsequent TTI (e.g., a subframe 'N+1'). In some aspects, the first resource allocation may be associated with the first narrowband, and the second resource allocation may be associated with the second narrowband. In some aspects, a portion of the first resource allocation may be located outside the first narrowband or a portion of the second resource allocation may be located outside the second narrowband.

In an example, the UE may identify a set of resource blocks allocated for the first communication at subframe 'N' and identify a set of resource blocks allocated for the second communication at subframe 'N+1'. The operations of 1505 may be performed according to the methods described herein. In some examples, aspects of the operations of 1505 may be performed by a RA component as described with reference to FIGS. 11 through 14.

At 1510, the UE may determine that a first tuning band associated with the first resource allocation (e.g., for the first TTI) is different from a second tuning band associated with the second resource allocation (e.g., for the second TTI). For example, the UE may determine whether the set of resource blocks allocated for the first communication at subframe 'N' differ from the set of resource blocks allocated for the second communication at subframe 'N+1'.

In some cases, the UE may determine the second tuning band based on the second resource allocation and a set of RBGs for the system bandwidth. For example, if the UE determines that one of the resource blocks allocated for the second communication (e.g., a portion of the second resource allocation) is outside the second narrowband, the UE may newly define a tuning band (e.g., the second tuning band) for retuning. For example, the UE may newly define a the tuning band (e.g., the second tuning band) for the second resource allocation, where the second tuning band is within the second narrowband.

In some aspects, the UE may define or determine the second tuning band based on RBGs for the system bandwidth and associated with the second resource allocation. For example, the UE may determine RBGs associated with the resource blocks of the second resource allocation. Accordingly, the UE may define or determine the second tuning band based on an alignment between resource blocks (e.g., a starting resource block, an ending resource block) of the second resource allocation and boundaries of the RBGs. The operations of 1510 may be performed according to the methods described herein. In some examples, aspects of the operations of 1510 may be performed by a tuning band component as described with reference to FIGS. 11 through 14.

At 1515, the UE may retune from the first tuning band to the second tuning band. In an example, the UE may retune from the first tuning band to the second tuning band between the first communication and the second communication, based on determining that the first tuning band is different from the second tuning band.

In an example, the UE may determine whether to retune between a communication in subframe 'N' and a communication in subframe 'N+1' based on whether a narrowband containing the resource allocation changes between the subframes. For example, the UE may retune from the first tuning band to the second tuning band between the first communication at subframe 'N' and the second communication at subframe 'N'. Accordingly, the UE may retune so as to switch from using the resource blocks allocated for the first communication to using the resource blocks allocated for the second communication (e.g., the resource blocks of the newly defined tuning band, that is, the second tuning band). The operations of 1515 may be performed according to the methods described herein. In some examples, aspects of the operations of 1515 may be performed by a retuning component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    identifying, at the UE, a first resource allocation for a first communication in a first transmission time interval (TTI) and a second resource allocation for a second communication in a second, subsequent TTI, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;
    determining a second tuning band based at least in part on the second resource allocation and a set of resource block groups (RBGs) for a system bandwidth, wherein a starting RB of the second tuning band is based at least in part on an alignment of a starting RB of the second resource allocation with a boundary of an RBG of the set of RBGs; and
    retuning from a first tuning band to the second tuning band between the first communication and the second communication based at least in part on determining that the first tuning band associated with the first resource allocation for the first TTI is different from the second tuning band associated with the second resource allocation for the second TTI.

2. The method of claim 1, further comprising:
    determining an ending RB of the second tuning band based at least in part on an alignment of an ending RB of the second resource allocation with the boundary of the RBG of the set of RBGs.

3. The method of claim 1, wherein the UE is configured for monitoring a control channel within the first narrowband.

4. The method of claim 3, further comprising:
    refraining from monitoring the control channel in the second TTI based at least in part on determining that at least a portion of the control channel does not overlap with the second tuning band.

5. The method of claim 3, further comprising:
    identifying a portion of the control channel within the first narrowband that overlaps in frequency with the second tuning band; and
    monitoring, in the second TTI, the portion of the control channel for control information.

6. The method of claim 5, further comprising:
    monitoring an adjusted control channel in the second TTI for control information, the adjusted control channel being adjusted based at least in part on a relative offset of the second tuning band to the first narrowband.

7. The method of claim 1, further comprising:
    receiving one or more bits indicating a shift of the second narrowband; and
    determining the second tuning band based at least in part on the shift.

8. The method of claim 1, further comprising:
    receiving one or more bits indicating a shift of the second resource allocation relative to the second narrowband; and
    determining the second tuning band based at least in part on the shift.

9. The method of claim 8, wherein the second tuning band starts at a starting RB of the second resource allocation.

10. The method of claim 8, wherein the second tuning band ends at an ending RB of the second resource allocation.

11. The method of claim 1, further comprising:
    determining the second tuning band to start from a lowest RB of the system bandwidth when the at least one RB of the second resource allocation located outside the second narrowband includes one or more edge RBs at a lower end of the system bandwidth that are not included in a narrowband of the system bandwidth.

12. The method of claim 1, further comprising:
    determining the second tuning band to end at a highest RB of the system bandwidth when the at least one RB of the second resource allocation outside the second narrowband includes one or more edge RBs at an upper end of the system bandwidth that are not included in a narrowband of the system bandwidth.

13. The method of claim 1, further comprising:
    determining the second tuning band to start from a starting RB of the second resource allocation, or end at an ending RB of the second resource allocation.

14. The method of claim 1, further comprising:
    receiving, from a base station, control information indicating the first resource allocation, the second resource allocation, or both.

15. The method of claim 1, wherein the first tuning band corresponds to the first narrowband.

16. The method of claim 1, wherein the second tuning band corresponds to the second narrowband.

17. The method of claim 1, wherein:
    identifying the second resource allocation comprises receiving control information in a TTI prior to the second TTI, the control information comprising a grant for the second resource allocation.

18. The method of claim 1, wherein each of the first and second tuning bands are composed of continuous frequency resources having a same size as the first or the second narrowband.

19. The method of claim 1, wherein the first narrowband and the second narrowband correspond to a common narrowband.

20. The method of claim 19, wherein the first tuning band corresponds to the common narrowband.

21. The method of claim 1, wherein the first narrowband is different from the second narrowband.

22. The method of claim 1, further comprising:
    identifying a configuration for transmitting a sounding reference signal (SRS) in the first TTI; and
    refraining from transmitting the SRS based at least in part on determining the first tuning band is different from the second tuning band.

23. The method of claim 1, further comprising:
    identifying a configuration for transmitting a sounding reference signal (SRS) in the first TTI, wherein a portion of the SRS is outside the second tuning band; and
    refraining from transmitting the SRS based at least in part on identifying that the portion of the SRS is outside the second tuning band.

24. The method of claim 1, further comprising:
    identifying a configuration for a sounding reference signal (SRS) in the first TTI, wherein a portion of the SRS is outside the second tuning band;
    establishing a guard period between the first communication in the first TTI and the second communication in the second TTI; and
    transmitting the SRS based at least in part on the establishing.

25. The method of claim 1, further comprising:
    establishing a guard period between the first communication in the first TTI and the second communication in the second TTI.

26. The method of claim 25, wherein establishing the guard period comprises:
    puncturing one or more symbols of the second communication based at least in part on the retuning.

27. The method of claim 26, wherein the puncturing is based at least in part on determining that the first and second communications are downlink communications.

28. The method of claim 26, wherein the puncturing is based at least in part on determining that the first communication is an uplink communication and the second communication is a downlink communication.

29. A method for wireless communication by a user equipment (UE), comprising:
    identifying, at the UE, a first resource allocation for a first communication in a first transmission time interval (TTI) and a second resource allocation for a second communication in a second, subsequent TTI, wherein the second communication comprises an uplink communication, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;
    determining a center frequency of the second communication based at least in part on a coverage enhancement mode for the UE, a tuning time capability of the UE, a tuning configuration received from a base station, a reference signal configuration for the second communication, or a combination thereof; and
    retuning from a first tuning band to a second tuning band between the first communication and the second communication based at least in part on determining that the first tuning band associated with the first resource allocation for the first TTI is different from the second tuning band associated with the second resource allocation for the second TTI.

30. The method of claim 29, wherein the determining the center frequency of the second communication comprises:
    setting the center frequency associated with the second communication to coincide with a center of the second tuning band.

31. The method of claim 29, wherein the determining the center frequency of the second communication comprises:
    setting the center frequency associated with the second communication to coincide with a center of the second resource allocation.

32. The method of claim 29, wherein the tuning configuration is received from the base station in a unicast transmission or a broadcast transmission.

33. The method of claim 29, wherein the coverage enhancement mode for the UE is one of a first coverage enhancement mode associated with a first amount of repetition or a second coverage enhancement mode associated with a second, larger amount of repetition.

34. An apparatus for wireless communication, comprising:
    a processor;
    memory in electronic communication with the processor; and
    instructions stored in the memory and executable by the processor to cause the apparatus to:
    identify, at the apparatus, a first resource allocation for a first communication in a first transmission time interval (TTI) and a second resource allocation for a second communication in a second, subsequent TTI, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;

determine a second tuning band based at least in part on the second resource allocation and a set of resource block groups (RBGs) for a system bandwidth, wherein a starting RB of the second tuning band is based at least in part on an alignment of a starting RB of the second resource allocation with a boundary of an RBG of the set of RBGs; and retune from a first tuning band to the second tuning band between the first communication and the second communication based at least in part on determining that the first tuning band associated with the first resource allocation for the first TTI is different from the second tuning band associated with the second resource allocation for the second TTI.

35. The apparatus of claim 34, wherein the instructions are further executable by the processor to cause the apparatus to:

determine an ending RB of the second tuning band based at least in part on an alignment of an ending RB of the second resource allocation with the boundary of the RBG of the set of RBGs.

36. The apparatus of claim 34, wherein the apparatus is configured for monitoring a control channel within the first narrowband.

37. The apparatus of claim 36, wherein the instructions are further executable by the processor to cause the apparatus to:

refrain from monitoring the control channel in the second TTI based at least in part on determining that at least a portion of the control channel does not overlap with the second tuning band.

38. The apparatus of claim 36, wherein the instructions are further executable by the processor to cause the apparatus to:

identify a portion of the control channel within the first narrowband that overlaps in frequency with the second tuning band; and monitor, in the second TTI, the portion of the control channel for control information.

39. The apparatus of claim 38, wherein the instructions are further executable by the processor to cause the apparatus to:

monitor an adjusted control channel in the second TTI for control information, the adjusted control channel being adjusted based at least in part on a relative offset of the second tuning band to the first narrowband.

40. The apparatus of claim 34, wherein the instructions are further executable by the processor to cause the apparatus to:

receive one or more bits indicating a shift of the second narrowband; and determine the second tuning band based at least in part on the shift.

41. The apparatus of claim 34, wherein the instructions are further executable by the processor to cause the apparatus to:

receive one or more bits indicating a shift of the second resource allocation relative to the second narrowband; and determine the second tuning band based at least in part on the shift.

42. The apparatus of claim 41, wherein the second tuning band starts at a starting RB of the second resource allocation.

43. The apparatus of claim 41, wherein the second tuning band ends at an ending RB of the second resource allocation.

44. The apparatus of claim 34, wherein the instructions to determine the second tuning band are executable by the processor to cause the apparatus to:

determine the second tuning band to start from a lowest RB of the system bandwidth when the at least one RB of the second resource allocation located outside the second narrowband includes one or more edge RBs at a lower end of the system bandwidth that are not included in a narrowband of the system bandwidth.

45. The apparatus of claim 34, wherein the instructions are further executable by the processor to cause the apparatus to:

determine the second tuning band to end at a highest RB of the system bandwidth when the at least one RB of the second resource allocation outside the second narrowband includes one or more edge RB s at an upper end of the system bandwidth that are not included in a narrowband of the system bandwidth.

46. The apparatus of claim 34, wherein the instructions are further executable by the processor to cause the apparatus to:

determine the second tuning band to start from a starting RB of the second resource allocation, or end at an ending RB of the second resource allocation.

47. The apparatus of claim 34, wherein the instructions are further executable by the processor to cause the apparatus to:

receive, from a base station, control information indicating the first resource allocation, the second resource allocation, or both.

48. The apparatus of claim 34, wherein the first tuning band corresponds to the first narrowband.

49. The apparatus of claim 34, wherein the second tuning band corresponds to the second narrowband.

50. The apparatus of claim 34, wherein the instructions to identify the second resource allocation are executable by the processor to cause the apparatus to receive control information in a TTI prior to the second TTI, the control information comprising a grant for the second resource allocation.

51. The apparatus of claim 34, wherein each of the first and second tuning bands are composed of continuous frequency resources having a same size as the first or second narrowband.

52. The apparatus of claim 34, wherein the first narrowband and the second narrowband correspond to a common narrowband.

53. The apparatus of claim 52, wherein the first tuning band corresponds to the common narrowband.

54. The apparatus of claim 34, wherein the first narrowband is different from the second narrowband.

55. The apparatus of claim 34, wherein the instructions are further executable by the processor to cause the apparatus to:

identify a configuration for transmitting a sounding reference signal (SRS) in the first TTI; and refrain from transmitting the SRS based at least in part on determining the first tuning band is different from the second tuning band.

56. The apparatus of claim 34, wherein the instructions are further executable by the processor to cause the apparatus to:

identify a configuration for transmitting a sounding reference signal (SRS) in the first TTI, wherein a portion of the SRS is outside the second tuning band; and refrain from transmitting the SRS based at least in part on identifying that the portion of the SRS is outside the second tuning band.

57. The apparatus of claim 34, wherein the instructions are further executable by the processor to cause the apparatus to:

identify a configuration for a sounding reference signal (SRS) in the first TTI, wherein a portion of the SRS is outside the second tuning band;

establish a guard period between the first communication in the first TTI and the second communication in the second TTI; and transmit the SRS based at least in part on the establishing.

58. The apparatus of claim 34, wherein the instructions are further executable by the processor to cause the apparatus to:

establish a guard period between the first communication in the first TTI and the second communication in the second TTI.

59. The apparatus of claim 58, wherein the instructions to establish the guard period are executable by the processor to cause the apparatus to:

puncture one or more symbols of the second communication based at least in part on the retuning.

60. The apparatus of claim 59, wherein the puncturing is based at least in part on determining that the first and second communications are downlink communications.

61. The apparatus of claim 59, wherein the puncturing is based at least in part on determining that the first communication is an uplink communication and the second communication is a downlink communication.

62. An apparatus for wireless communication, comprising:

a processor;

memory in electronic communication with the processor; and instructions stored in the memory and executable by the processor to cause the apparatus to:

identify, at the UE, a first resource allocation for a first communication in a first transmission time interval (TTI) and a second resource allocation for a second communication in a second, subsequent TTI, wherein the second communication comprises an uplink communication, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;

determine a center frequency of the second communication based at least in part on a coverage enhancement mode for the apparatus, a tuning time capability of the apparatus, a tuning configuration received from a base station, a reference signal configuration for the second communication, or a combination thereof; and retune from a first tuning band to a second tuning band between the first communication and the second communication based at least in part on determining that the first tuning band associated with the first resource allocation for the first TTI is different from the second tuning band associated with the second resource allocation for the second TTI.

63. The apparatus of claim 62, wherein the instructions to determine the center frequency of the second communication are executable by the processor to cause the apparatus to:

set the center frequency associated with the second communication to coincide with a center of the second tuning band.

64. The apparatus of claim 62, wherein the instructions to determine the center frequency of the second communication are executable by the processor to cause the apparatus to:

set the center frequency associated with the second communication to coincide with a center of the second resource allocation.

65. The apparatus of claim 62, wherein the tuning configuration is received from the base station in a unicast transmission or a broadcast transmission.

66. The apparatus of claim 62, wherein the coverage enhancement mode for the apparatus is one of a first coverage enhancement mode associated with a first amount of repetition or a second coverage enhancement mode associated with a second, larger amount of repetition.

67. An apparatus for wireless communication, comprising:

means for identifying, at the apparatus, a first resource allocation for a first communication in a first transmission time interval (TTI) and a second resource allocation for a second communication in a second, subsequent TTI, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;

means for determining a second tuning band based at least in part on the second resource allocation and a set of resource block groups (RBGs) for a system bandwidth, wherein a starting RB of the second tuning band is based at least in part on an alignment of a starting RB of the second resource allocation with a boundary of an RBG of the set of RBGs; and means for retuning from a first tuning band to the second tuning band between the first communication and the second communication based at least in part on determining that the first tuning band associated with the first resource allocation for the first TTI is different from the second tuning band associated with the second resource allocation for the second TTI.

68. A non-transitory computer-readable medium storing code for wireless communication, the code comprising instructions executable by a processor to:

identify, at a user equipment (UE), a first resource allocation for a first communication in a first transmission time interval (TTI) and a second resource allocation for a second communication in a second, subsequent TTI, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;

determine a second tuning band based at least in part on the second resource allocation and a set of resource block groups (RBGs) for a system bandwidth, wherein a starting RB of the second tuning band is based at least in part on an alignment of a starting RB of the second resource allocation with a boundary of an RBG of the set of RBGs; and retune from a first tuning band to a second tuning band between the first communication and the second communication based at least in part on determining that the first tuning band associated with the first resource allocation for the first TTI is different from the second tuning band associated with the second resource allocation for the second TTI.

69. An apparatus for wireless communication, comprising:

means for identifying, at the apparatus, a first resource allocation for a first communication in a first transmission time interval (TTI) and a second resource allocation for a second communication in a second, subsequent TTI, wherein the second communication comprises an uplink communication, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;

means for determining a center frequency of the second communication based at least in part on a coverage enhancement mode for the apparatus, a tuning time capability of the apparatus, a tuning configuration received from a base station, a reference signal configuration for the second communication, or a combination thereof; and means for retuning from a first tuning band to a second tuning band between the first communication and the second communication based at least in part on determining that the first tuning band associated with the first resource allocation for the first TTI is different from the second tuning band associated with the second resource allocation for the second TTI.

70. A non-transitory computer-readable medium storing code for wireless communication, the code comprising instructions executable by a processor to:

identify, at a user equipment (UE), a first resource allocation for a first communication in a first transmission time interval (TTI) and a second resource allocation for a second communication in a second, subsequent TTI, wherein the second communication comprises an uplink communication, wherein the first resource allocation is associated with a first narrowband comprising a first set of resource blocks (RBs) and the second resource allocation is associated with a second narrowband comprising a second set of RBs, and wherein at least one RB of the first resource allocation is located outside the first set of RBs or at least one RB of the second resource allocation is located outside the second set of RBs;

determine a center frequency of the second communication based at least in part on a coverage enhancement mode for the UE, a tuning time capability of the UE, a tuning configuration received from a base station, a reference signal configuration for the second communication, or a combination thereof; and retune from a first tuning band to a second tuning band between the first communication and the second communication based at least in part on determining that the first tuning band associated with the first resource allocation for the first TTI is different from the second tuning band associated with the second resource allocation for the second TTI.

* * * * *